(12) United States Patent
Petrov

(10) Patent No.: US 10,114,600 B2
(45) Date of Patent: *Oct. 30, 2018

(54) SYSTEMS AND METHODS FOR PROVIDING ADAPTED MULTI-MONITOR TOPOLOGY SUPPORT IN A VIRTUALIZATION ENVIRONMENT

(71) Applicant: CITRIX SYSTEMS, INC., Fort Lauderdale, FL (US)

(72) Inventor: Julian Petrov, Pembroke Pines, FL (US)

(73) Assignee: Citrix Systems, Inc., Fort Lauderdale, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/831,749

(22) Filed: Dec. 5, 2017

(65) Prior Publication Data

US 2018/0095710 A1 Apr. 5, 2018

Related U.S. Application Data

(63) Continuation of application No. 14/626,755, filed on Feb. 19, 2015.

(51) Int. Cl.
| | |
|---|---|
| *G06F 3/14* | (2006.01) |
| *G06F 9/44* | (2018.01) |
| *G06F 9/455* | (2018.01) |
| *G06F 9/451* | (2018.01) |
| *G09G 5/14* | (2006.01) |

(52) U.S. Cl.
CPC ............ *G06F 3/1438* (2013.01); *G06F 9/452* (2018.02); *G06F 9/45533* (2013.01); *G06F 3/1431* (2013.01); *G06F 3/1454* (2013.01); *G09G 5/14* (2013.01)

(58) Field of Classification Search
CPC .... G06F 3/1438; G06F 3/1431; G06F 3/1454; G06F 9/4445; G06F 9/45533
See application file for complete search history.

(56) References Cited

U.S. PATENT DOCUMENTS

| | | | |
|---|---|---|---|
| 7,995,003 | B1 | 8/2011 | Diard et al. |
| 2005/0166214 | A1 | 7/2005 | Kaulgud et al. |
| 2007/0124474 | A1 | 5/2007 | Margulis |
| 2010/0306306 | A1 | 12/2010 | Kamay |
| 2011/0246904 | A1 | 10/2011 | Pinto et al. |
| 2013/0063462 | A1 | 3/2013 | Bloomfield et al. |
| 2015/0154778 | A1 | 6/2015 | Hughes |
| 2016/0055613 | A1 | 2/2016 | Ai |

FOREIGN PATENT DOCUMENTS

| | | |
|---|---|---|
| EP | 2242240 | 10/2010 |
| WO | WO 2009143294 | 11/2009 |

*Primary Examiner* — Ariel Balaoing
(74) *Attorney, Agent, or Firm* — Allen, Dyer, Doppelt + Gilchrist, PA

(57) ABSTRACT

A server provides adaptive displaying on a plurality of display devices in a virtualization environment. The server includes a communication device to receive capabilities data associated with a plurality of graphics processing units (GPUs) of a client device, and a display driver to generate a plurality of display adapters based on the capabilities data. The communication device provides command data to the client device based on the plurality of display adapters. The command data is adapted to the capabilities of one or more of the plurality of GPUs.

20 Claims, 10 Drawing Sheets

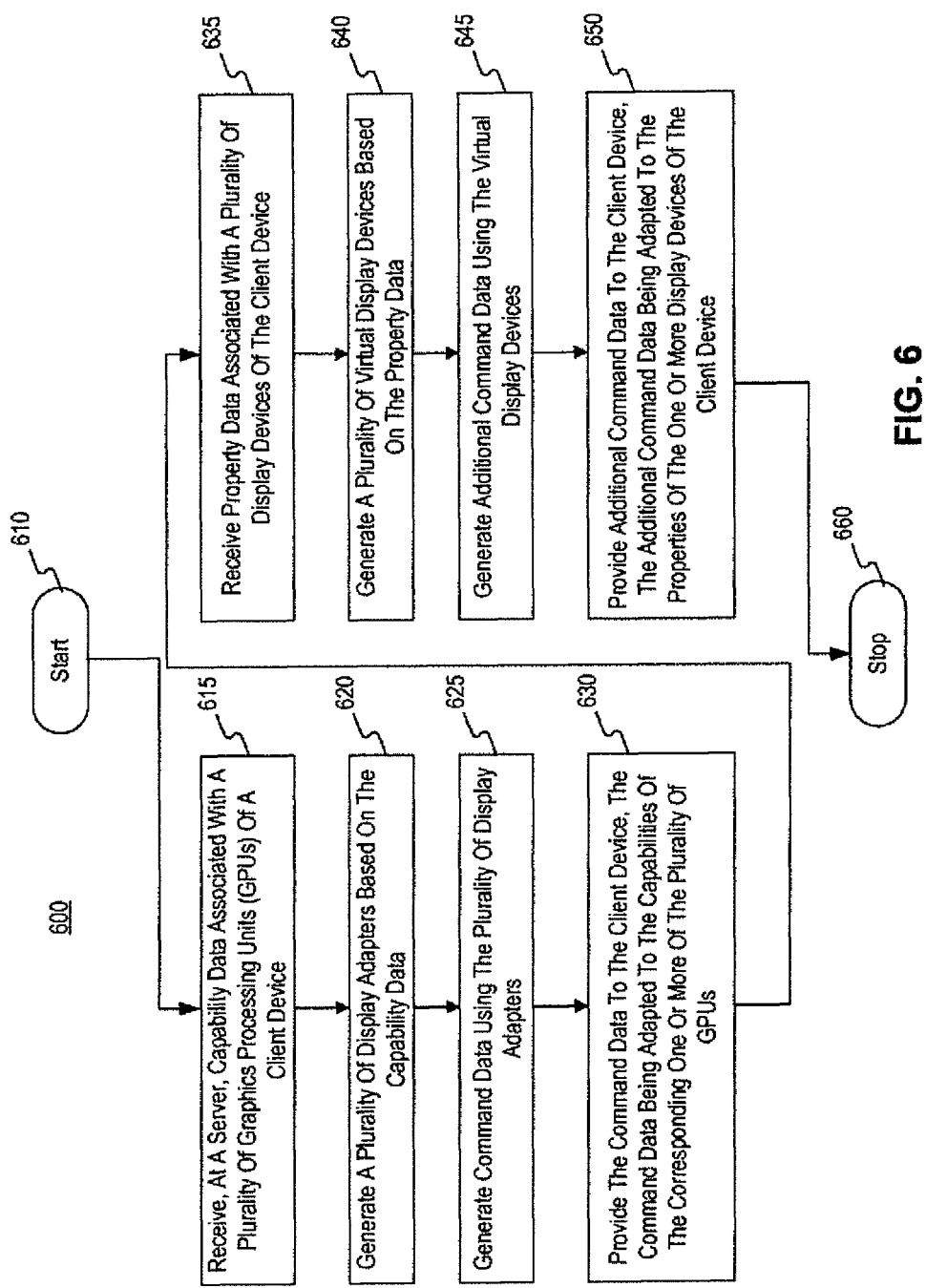

SYSTEMS AND METHODS FOR PROVIDING ADAPTED MULTI-MONITOR TOPOLOGY SUPPORT IN A VIRTUALIZATION ENVIRONMENT

RELATED APPLICATION

This application is a continuation of U.S. patent application Ser. No. 14/626,755 filed on Feb. 19, 2015, which is hereby incorporated herein in its entirety by reference.

BACKGROUND

Desktop virtualization technologies have become widely used in recent years. In a desktop virtualization environment, physical computing devices often provide for the use of multiple physical monitors, sometimes referred to as a "multi-monitor" mode. In the multi-monitor mode, a client device usually includes a desktop composition redirection (DCR), which can be a software application or a hardware device that supports one or more graphic processing units (GPUs) for driving the monitors. Typically, a single GPU can drive up to two monitors. When the client device supports more than two monitors, additional GPUs can be physically included in a peripheral component interconnect (PCI) card that is electrically coupled to the client device. The GPUs included in the PCI card are sometimes also referred to as "heads."

A PCI card can include the same type of GPUs or different types of GPUs. GPUs of difference types can correspond to different models provided by a same GPU vendor or can be provided by different GPU vendors. For example, different types of GPUs can be provided by Nvidia®, AMD®, Intel®, or ARM®. Different types of GPUs can have different capabilities and performances. When a client device includes multiple GPUs and operates in a multi-monitor mode, the OCR typically uses only one particular GPU for rendering graphics. The particular GPU for rendering graphics is usually the one having the highest capabilities. After the particular GPU renders the graphics, the DCR provides the rendering results to a monitor for displaying the graphics. The displaying monitor can be a monitor that is driven by a GPU that is different from the rendering GPU. As a result, the graphic processing and displaying performances are often negatively impacted because different GPUs can have different capabilities and performances.

In a virtualization environment, while theoretically the DCR can use the GPU that drives the displaying monitor to render graphics, compatibility issues can arise. For example, in a virtualization environment, the DCR of a client device receives DCR command data from a virtual delivery agent (VDA) of a server for operating the GPUs and monitors of the client device. To provide the DCR command data for driving multiple monitors associated with the client device, a Windows™ display driver model (WDDM) adapter of the VDA generates one or more virtual monitors on the VDA. But due to operating system limitations, a limited number of virtual monitors, such as eight virtual monitors, can usually be generated by a single WDDM adapter of the VDA. Moreover, the rendering capabilities of the GPUs of the client device are limited by the single WDDM adapter of the VDA. Further, because the rendering context is associated with the single WDDM adapter, duplicating the DCR command data for operating different types of GPUs and monitors of the client device is generally unfeasible or prone to compatibility issues.

SUMMARY

A server for providing adaptive displaying on a plurality of display devices in a virtualization environment includes a communication device configured to receive capabilities data associated with a plurality of graphics processing units (GPUs) of a client device, and a display driver configured to generate a plurality of display adapters based on the capabilities data. The communication device may be further configured to provide command data to the client device based on the plurality of display adapters. The command data is adapted to the capabilities of one or more of the plurality of GPUs.

The plurality of GPUs may include at least one GPU that has at least one different capability from the other GPUs, and each of the display adapters may correspond to one of the plurality of GPUs.

The capabilities data may represent GPU capabilities that include at least one of: texture mapping capabilities, rendering capabilities, acceleration and frame-buffering capabilities, shading capabilities, instruction processing capabilities, or video decoding capabilities.

Each GPU of the plurality of GPUs may be associated with one or more of the plurality of display devices.

The server may further include a window compositor configured to obtain the capabilities data from the corresponding one or more display adapters, and generate the command data based on the obtained capabilities data. The command data may allow each of the one or more GPUs to render graphics based on the corresponding GPU's capabilities.

The command data may provide two-dimensional (2D) or three-dimensional (3D) effects including at least one of: blending, fading, scaling, rotation, duplication, bending and contortion, shuffling, blurring, applications redirecting, or windows translating.

The communication device may be further configured to receive properties data associated with a plurality of display devices of the client device, with each of the plurality of display devices being associated with one of the plurality of GPUs. The display adapters may be configured to generate a plurality of virtual display devices based on the properties data, with each of the virtual display devices corresponding to one of the plurality of display devices of the client device. The window compositor may be further configured to generate additional command data using the plurality of virtual display devices. The communication device may be further configured to provide additional command data to the client device, with the additional command data being adapted to the properties of the one or more display devices of the client device.

The properties data may represent display device properties that include at least one of: extended display identification data (EDID) information, physical sizes of the display devices, display resolutions supported by the display devices, pixel pitches, luminance, aspect ratios, viewable image sizes, refresh rates, response times, contrast ratios, power consumptions, or color accuracies.

Another aspect is directed to a computer-implemented method for providing adaptive displaying on a plurality of display devices in a virtualization environment, with the method being performed by a server. The method may include receiving capabilities data associated with a plurality of graphics processing units (GPUs) of a client device, generating a plurality of display adapters based on the capabilities data, and providing command data to the client device based on the plurality of display adapters. The command data may be adapted to the capabilities of one or more of the plurality of GPUs.

Yet another aspect is directed to a non-transitory computer-readable medium storing a set of instructions that are executable by one or more processors of a server to cause the server to perform a method for providing adaptive displaying on a plurality of display devices in a virtualization environment or a remote computing environment, as described above.

BRIEF DESCRIPTION OF THE DRAWINGS

FIG. 6 is a flowchart of an illustrative method of a server that provides adaptive displaying on a plurality of display devices in a virtualization environment, consistent with embodiments as described herein.

DETAILED DESCRIPTION

Figure 1:
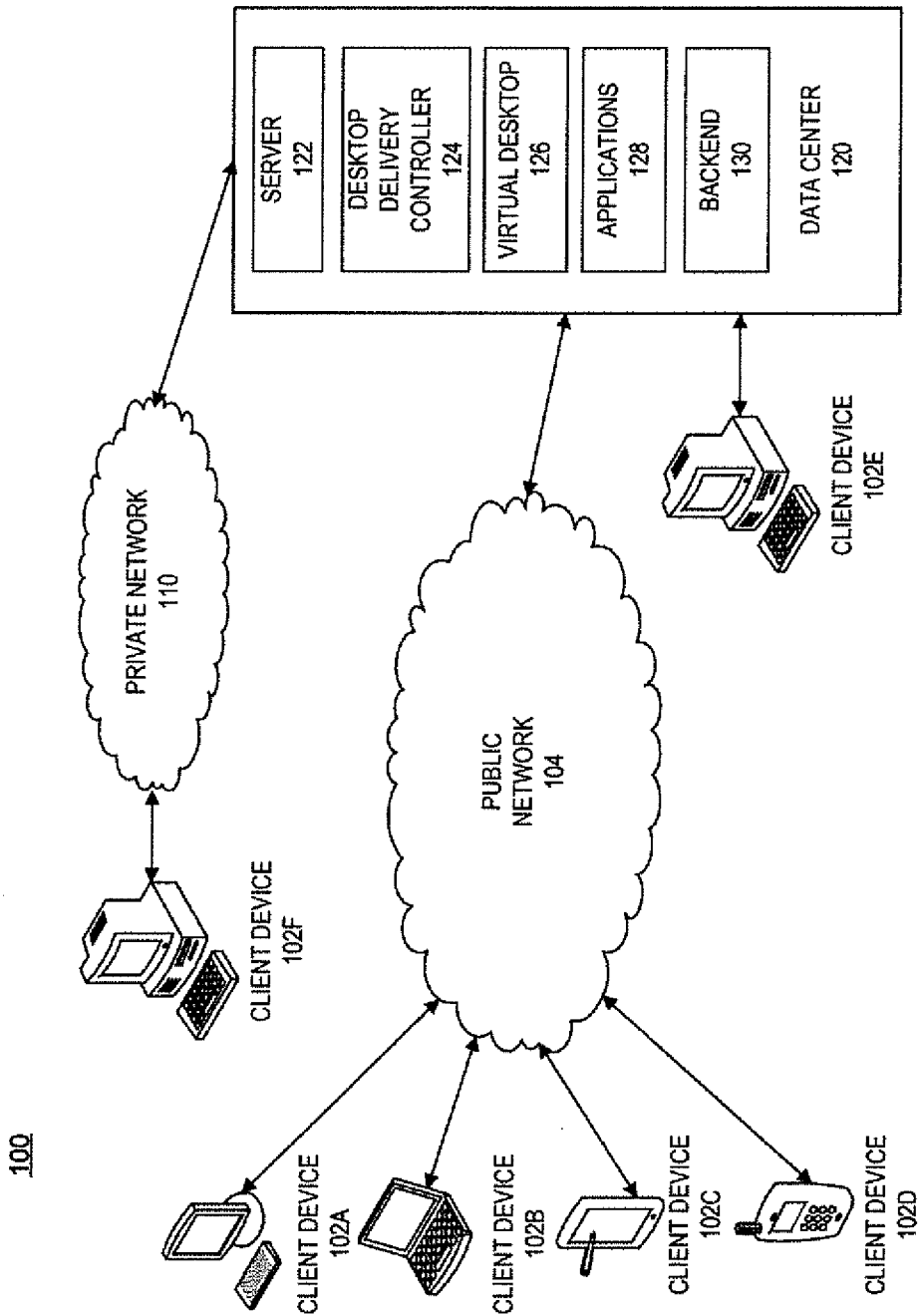
FIG. 1 is an illustrative computing environment for implementing embodiments and features as described herein.

Reference will now be made in detail to the embodiments as described herein, certain examples of which are illustrated in the accompanying drawings.

The described embodiments relate to computerized systems and methods for providing adaptive displaying on a plurality of display devices in a virtualization environment. Virtualization can refer to generating a virtual version of a physical device or resource. Many computing technologies can be virtualized, such as computing devices, servers, desktops, storage devices, networks, operating systems, and applications. In a hardware virtualization environment, sometimes also referred to as a platform virtualization environment, a virtual machine can simulate a physical computer running a certain operating system. In particular, software executed on these virtual machines can be separated from the underlying hardware resources. As a result, virtual machines running on the same host computer can each simulate separate computers running separate operating systems. For example, a computer can host a virtual machine that simulates a computer running a Linux operating system, based on which Linux-based software can be executed, and can also host a different virtual machine that simulates a computer running a Windows™ operating system, based on which Windows™-based software can be executed.

Users of client devices can access a virtualization environment to view and interact with virtual desktops hosted on virtual machines. Application virtualization can be used with desktop virtualization to provide users with a virtual desktop environment in which some or all of the components of a desktop are virtualized. For example, a user of a client device could request a virtual desktop of a virtual machine running a Microsoft Windows™ operating system, which could emulate a desktop of a Microsoft Windows™ operating system operating on a physical computing device. The client device can allow the user to open a virtual Microsoft™ Word application from the hosted virtual desktop. The opened virtual Microsoft™ Word application can emulates a Microsoft™ Word application that would open on a physical computing device running a Microsoft Windows™ operating system.

In virtual desktop environments, for example, applications and operating systems can be stored at a central location, and provided on demand to users of a variety of different types of devices running a variety of different operating systems from a variety of different locations. Virtual desktop environments can also allow network administrators to better control access to sensitive information, because all of the information can be stored at a central location and streamed to users on demand during hosted virtual desktop sessions. Virtual desktop environments can further provide users with better systems for backing up information, because all of the information can be stored at a central location that has better or more redundant systems for backing up the information.

In accordance with embodiments as described herein, a server in a virtual desktop environment can be configured to provide adaptive displaying on a plurality of display device of a client device. The server can generate and provide command data that are adapted to capabilities of a plurality of GPUs of the client device and adapted to the properties of the display devices of the client device. Using the command data, the GPUs of the client device can adaptively process the graphics according to their capabilities and the display devices can adaptively display processed graphics according to their properties. As a result, the performance of the GPUs and display devices of the client device can be enhanced.

The computer-implemented methods disclosed herein can be executed, for example, by one or more processors that receive instructions from one or more non-transitory computer-readable storage mediums. Similarly, systems consistent with the described embodiments can include at least one processor and memory, and the memory can be a non-transitory computer-readable medium. As used herein, a non-transitory computer-readable storage medium refers to any type of memory on which information or data readable by a processor can be stored. Examples include random access memory (RAM), read-only memory (ROM), volatile memory, nonvolatile memory, hard drives, compact disc read-only memory (CD ROM), digital versatile disc (DVD) memory, flash drives, magnetic strip storage, semiconductor storage, optical disc storage, magneto-optical disc storage, flash memory, registers, caches, and/or any other storage medium. Singular terms, such as "memory" and "computer-readable storage medium," can additionally refer to multiple structures, such as a plurality of memories and/or computer-readable storage mediums.

Before explaining illustrative embodiments in detail, it is appreciated that the disclosure is not limited in its application to the details of constructions and to the arrangements set forth in the following description or illustrated in the drawings. The disclosure is capable of embodiments in addition to those described and is capable of being practiced and carried out in various ways. Also, it is appreciated that the phraseology and terminology employed herein, as well as in the abstract, are for the purposes of description and should not be regarded as limiting.

The accompanying drawings, which are incorporated and constitute part of the specification, illustrate certain embodiments, and together with the description, serve to explain the principles of the disclosure. As such, it is appreciated that the conception upon which the disclosure is based can readily be utilized as a basis for designing other structures, methods, and/or systems for carrying out the several purposes of the present disclosure. Therefore, it is further appreciated that the claims should be regarded as including such equivalent constructions insofar as they do not depart from the spirit and scope of the present disclosure.

FIG. 1 is a block diagram of an illustrative computing environment 100 for implementing embodiments and features as described herein. The arrangement and number of components in computing environment 100 is provided for purposes of illustration. Additional arrangements, number of components, and other modifications can be made.

As shown in FIG. 1, computing environment 100 can include any combination of one or more client devices 102A-F (collectively as client devices 102), public network(s) 104, private network(s) 110, and data center(s) 120. While client devices 102A-F are depicted as a computer (e.g., client devices 102A, 102E, and 102F), a laptop (e.g., client device 102B), a tablet (e.g., client device 102C), and a mobile smart phone (e.g., client device 102D), the described embodiments are not limiting. One or more of client devices 102 can be, for example, a mobile phone, smart phone, tablet, netbook, electronic reader, personal digital assistant (PDA), personal computer, laptop computer, smart watch, smart glasses, gaming device, desktop computer, set-top box, television, personal organizer, portable electronic device, smart appliance, navigation device, and/or other types of computing devices. In some embodiments, a client device 102A-F can be implemented with hardware devices and/or software applications running thereon. A user can use a client device 102A-F to communicate with one or more other client devices 102A-F and/or data center(s) 120 over public network(s) 104 and/or private network(s) 110. A client device 102A-F can communicate by transmitting data to and/or receiving data from other client device(s) 102A-F and/or data center(s) 120 over public network(s) 104 and/or private network(s) 110. Although FIG. 1 illustrates six client devices, this is not to be limiting. Computing environment 100 can include any number of client devices, and/or any combination of types of client devices. In some embodiments, client devices 102 can provide adaptive displaying on a plurality of display devices in a virtualized environment, as described below in more detail.

In some embodiments, a client device 102 can be a remote computer (e.g., a remote PC) allowing remote access of its hardware and/or software resources over public network(s) 104 and/or private network(s) 110. For example, using a remote desktop application, server 122 of data center(s) 120 can access client device 102, such as obtain data (e.g., GPUs' capabilities data and/or display devices' properties data) from client 102 or provide instructions (e.g., command data) to client 102.

Computing environment 100 can also include one or more public networks 104 and/or private networks 110. Public network(s) 104 and/or private network(s) 110 can connect and provide for the exchange of information among client device(s) 102A-F, among data center(s) 120, and/or between client device(s) 102A-F and data center(s) 120. Public network(s) 104 and/or private network(s) 110 can include one or more types of networks interconnecting client device(s) 102A-F and/or data center(s) 120. For example, one client device 102A-F can communicate with a data center 120 using a different type of network than a second client device 102A-F.

Public network(s) 104 and/or private network(s) 110 can be implemented using one or more networks, which can include one or more wide area networks (WANs), metropolitan area networks (MANs), local area networks (LANs), or personal area networks (PANs), or any combination of these networks. Public network(s) 104 and/or private network(s) 110 can include any one or more types of networks, including Internet, intranet, Ethernet, twisted-pair, coaxial cable, fiber optic, cellular, satellite, IEEE 802.11, terrestrial, and/or other types of wired or wireless networks.

Computing environment 100 can further include one or more data centers 120. A data center 120 can be a central repository, either physical or virtual, for the storage, management, and/or dissemination of data and/or information pertaining to a particular public and/or private entity. A data center 120 can include one or more physical servers, virtual servers, storage systems, web servers, databases, mainframe computers, general-purpose computers, personal computers, or other types of computing devices. A data center can include, among other things, one or more servers (e.g., server(s) 122), desktop delivery controller(s) 124, virtual desktop(s) 126, application(s) 128, and backend system(s) 130. In some embodiments, a data center 120 can be configured to store information, retrieve information, receive information, and/or provide information. A data center 120 can be a standalone computer system or apparatus, or can include and/or be part of a larger system. For example, a data center 120 can represent one or more computing components, such as server(s) 122, that can communicate with one another over a communications network, or over a dedicated network, such as a LAN. A data center 120 can include one or more backend systems 130 for carrying out one or more aspects as described herein.

A data center 120 can be implemented as a system comprising a plurality of servers, or a server farm comprising a load balancing system and a plurality of servers. In some embodiments, a data center 120 can include one or more servers 122 with hardware devices and/or software applications running thereon. Data center(s) 120 can communicate with client device(s) 102A-F over public network(s) 104 and/or private network(s) 110. One or more of client devices 102A-F can acquire remote services from data center(s) 120 through various means. For example, client devices 102A-F can communicate with data center 120 either directly (e.g., client device 102E) or indirectly through public network(s) 104 (e.g., client devices 102A-D) and/or private network(s) 110 (e.g., client device 102F).

A server 122 can be an entity represented by an Internet Protocol (IP) address, and can exist as a single entity or as a member of a server farm. A server 122 can be a physical server or a virtual server. In some embodiments, a server 122 can include one or more hardware layers, operating systems, and/or hypervisors creating and/or managing one or more virtual machines. A server 122 can provide one or more services to an endpoint, such as a client device 102A-F.

These services can include providing one or more virtual desktops operating on one or more virtualized platforms and/or one or more applications 128 to one or more endpoints (e.g., client devices 102A-F). For example, application(s) 128 can include physical and/or virtualized application(s) and/or resource(s) based on any type of platform, such as a Windows™-based or SAP™-based system. Server 122 can communicate with other devices (e.g., client devices 102A-F) through various types of networks (e.g., private network(s) 110 and/or public network(s) 104). In some embodiments, server 122 can, provide adaptive displaying on a plurality of monitors in a virtualized environment, as described below in more detail.

Desktop delivery controller(s) 124 can provide delivery of services, such as virtual desktops 126 to client devices (e.g., client devices 102A-F). Desktop delivery controller(s) 124 can be implemented in software and/or hardware within a computer system, such as computer system 200 of FIG. 2. Desktop delivery controller(s) 124 can provide functionality to manage, maintain, and/or optimize virtual desktop communications. In some embodiments, desktop delivery controller(s) 124 can control, manage, maintain, and/or optimize the provisioning of one or more applications 128.

In some embodiments, one or more virtual desktops 126 can provide one or more application(s) 128. A virtual desktop 126 can include a shared desktop allowing users to access a single shared remote-desktop-services desktop, a virtual desktop infrastructure (VDI) desktop allowing a user to have his/her own virtual machine, a streaming disk image, a local virtual machine, individual applications (e.g., one or more of applications 128), or a combination thereof.

Backend system(s) 130 can include a single or multiple instances of computer networking hardware, appliances, and/or servers in a server farm or a group of servers. Backend system(s) 130 can interface directly or indirectly with server(s) 122. For example, backend system(s) 130 can provide Microsoft Active Directory services, which can provide a number of network services, including one or more of lightweight directory access protocol (LDAP) directory services, Kerberos-based authentication services, domain name system (DNS) based naming and other network information services, and/or synchronization of directory updates amongst server(s) 122. Backend system(s) 130 can also include, among other things, one or more Oracle-based backend server(s), structured query language (SQL) server backends, and/or dynamic host configuration protocol (DHCP) server backends. Backend system(s) 130 can provide data, services, or a combination of both to data center(s) 120, which can then provide that information via one or more forms to client device(s) 102A-F and/or branch office(s) (not shown).

Figure 2A:
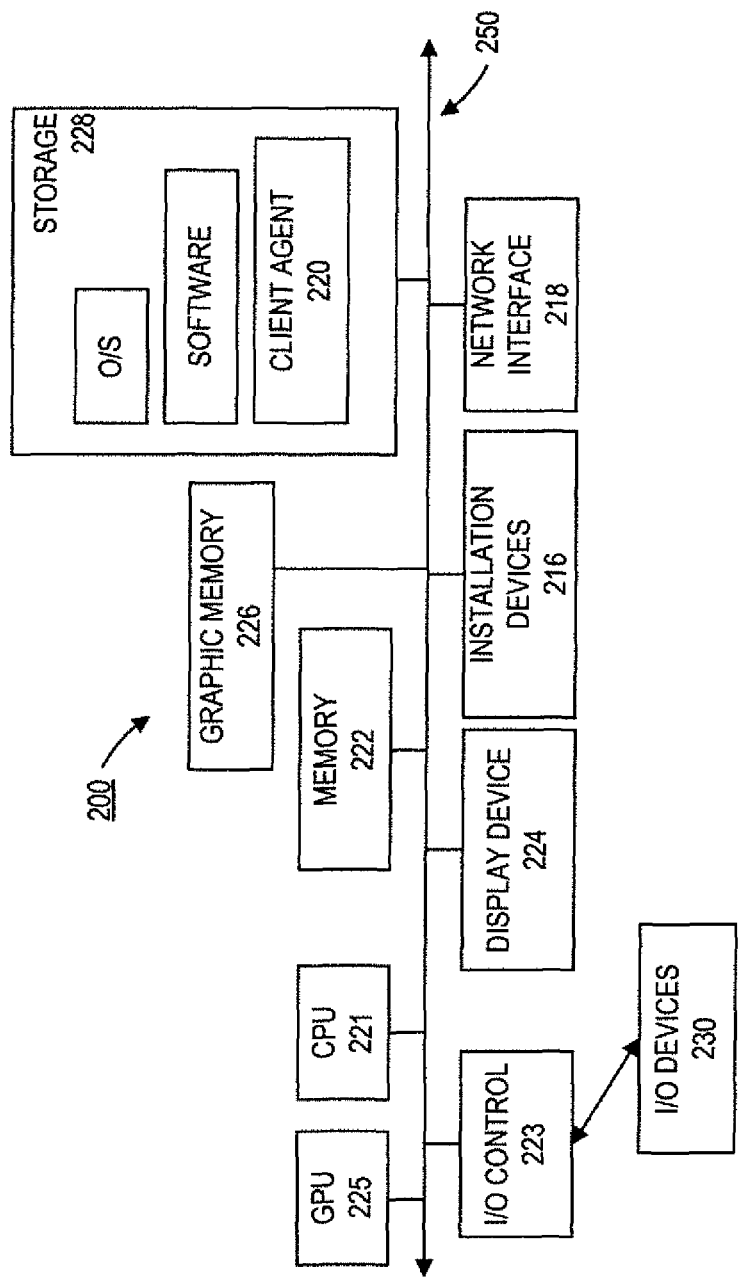
FIG. 2A is an illustrative computer system for implementing embodiments and features as described herein.
Figure 2B:
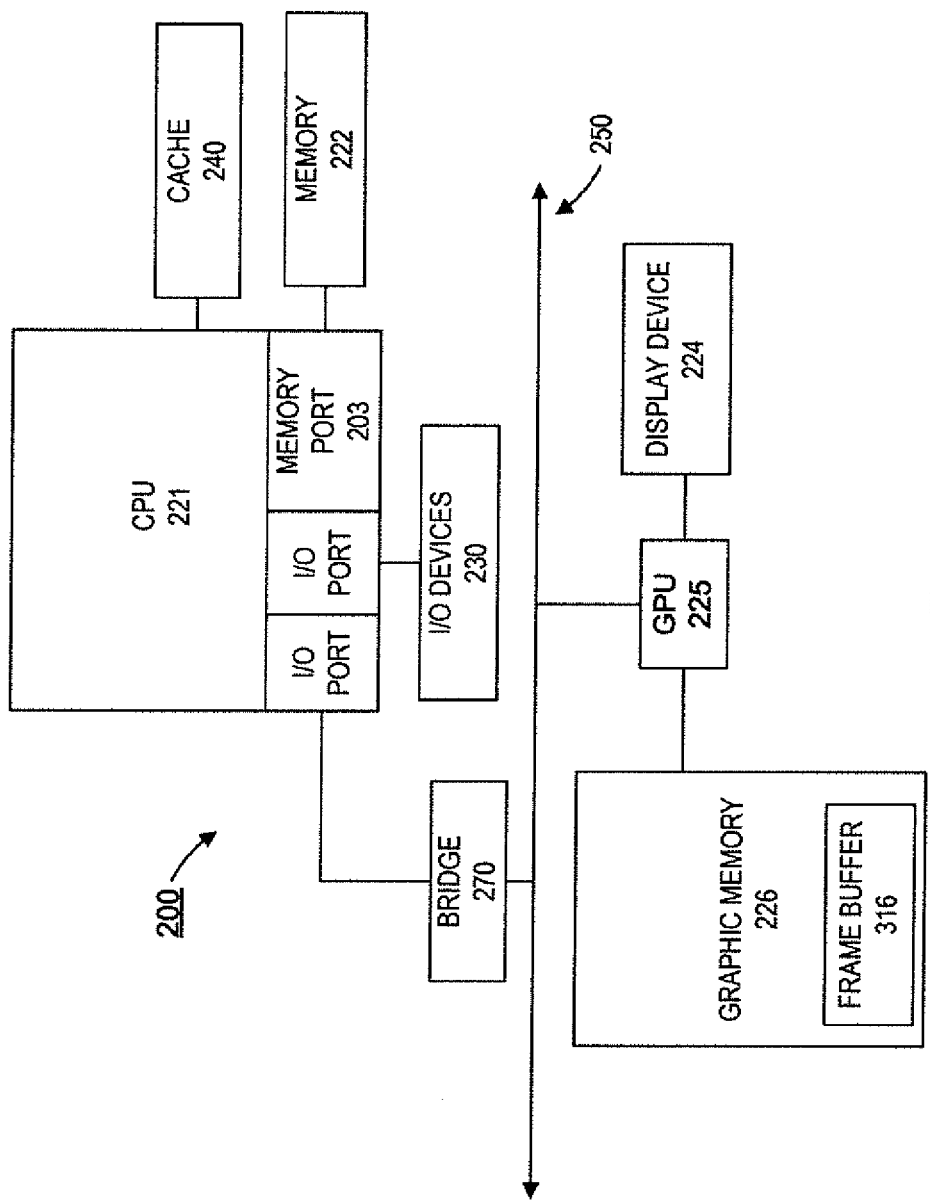
FIG. 2B is an illustrative computer system for implementing embodiments and features as described herein.

FIGS. 2A and 2B are block diagrams illustrative of a computer system 200 that can be used for implementing embodiments as described herein, including the systems and methods as described herein. A computer system 200 can be used to implement server(s) 122, backend system(s) 130, desktop delivery controller(s) 124, and/or client device(s) 102A-F. The arrangement and number of components in computer system 200 is provided for purposes of illustration. Additional arrangements, number of components, or other modifications can be made, consistent with the described embodiments.

As shown in FIGS. 2A and 2B, a computer system 200 can include one or more central processing units (CPUs) 221 for executing instructions. CPUs suitable for the execution of instructions include, by way of example, both general and special purpose CPUs, and any one or more processors of any kind of digital computer. CPU(s) 221 can include any logic circuitry that responds to and processes instructions received from one or more memories 222 and/or storage devices 228. CPU(s) 221 can include a single or multiple microprocessors, field-programmable gate arrays (FPGAs), or digital signal processors (DSPs) capable of executing particular sets of instructions stored in one or more memories 222, storage devices 228, and/or caches (e.g., cache(s) 240).

A computer system 200 can include one or more memories 222, storage devices 228, and/or caches 240, configured to store data and/or software instructions used by CPU(s) 221 to perform operations consistent with disclosed embodiments. For example, computer system 200 can include one or more memories 222 and/or storage devices 228 configured to store one or more software programs that, when executed by CPU(s) 221, cause CPU(s) 221 to perform functions and/or operations consistent with disclosed embodiments. By way of example, a memory 222 and/or storage device 228 can include one or more tangible non-transitory computer-readable mediums, such as NOR or NAND flash memory devices, flexible disks, hard disks, read-only memories (ROMs), random access memories (RAMS), compact disk read-only memories (CD ROMs), magneto-optical (MO) drives, digital versatile disk read-only memories (DVD-ROMs), digital versatile disk random-access memories (DVD-RAMs), semiconductor memories, tape drives, redundant array of independent disks (RAID arrays), etc. A memory 222 and/or storage device 228 can include one or more memory chips capable of storing data and/or allowing storage locations to be directly accessed by CPU(s) 221. In some embodiments, CPU(s) can communicate with one or more memories 222 and/or storage devices 228 via a system bus 250. A computer system 200 can include any number of memories 222 and/or storage devices 228. Memories 222 and/or storage devices 228 can be located remotely and computer system 200 can be able to access other memories 222 and/or storage devices 228 via a network, such as private network(s) 110 and/or public network(s) 104, One or more memories 222 and/or storage devices 228 can be configured to store data, and can store data received from one or more server(s) 122, backend system(s) 130, and/or client device(s) 102A-F. One or more memories 222 and/or storage devices 228 can also store one or more operating systems, application software programs, and/or other software.

A computer system 200 can also include one or more graphics processing units (GPUs) 225. A GPU 225 can be any type of specialized circuitry that can manipulate and alter memory (e.g., a graphic memory 226) to provide and/or accelerate the creation of images stored in a frame buffer (e.g., frame buffer 316 shown in FIG. 2B) for output to one or more physical display devices (e.g., display devices 224). GPUs can have a highly parallel structure making them more effective than general-purpose CPUs 221 for algorithms where processing of large blocks of graphical data can be performed in parallel. Furthermore, the functionality of one or more GPUs 225 can also be included in a chipset in some other type of special purpose processing unit or co-processor.

CPU(s) 221 can connect to system interface(s) 250, and can connect with one or more memories 222 and/or storage devices 228 over system interface(s) 250. CPU(s) 221 can also communicate with one or more memories 222 and/or storage devices 228 over a serial communication bus and/or using point-to-point communication. Similarly, GPU(s) 225 can communicate with one or more graphic memories 226, memories 222, and/or storage devices 228 using system interface(s) 250 and/or using other types of busses. CPU(s) 221 can execute programming instructions stored in one or more memories 222, operate on data stored in one or more memories 222, and/or communicate with GPU(s) 225 through system interface(s) 250, which bridge communication between CPU(s) 221 and GPU(s) 225. In some embodiments, CPU(s) 221, GPU(s) 225, system interface(s) 250, or any combination thereof, can be integrated into a single processing unit. GPU(s) 225 can be capable of executing particular sets of instructions stored in one or more memories 222 to manipulate graphical data stored in one or more memories 222 and/or one or more graphic memories 226. For example, GPU(s) 225 can receive instructions transmitted by CPU(s) 221 and process the instructions in order to render graphics data stored in one or more graphic memories 226. A graphic memory 226 can be any memory accessible by GPU(s) 225, including a local memory, a system memory, an on-chip memory, a hard disk, and/or any other type of memory 222 or storage device 228. GPU(s) 225 can allow displaying of graphical data stored in one or more graphic memories 226 on display devices 224.

A computer system 200 can also include one or more display devices 224 for displaying data and information. Display devices 224 can be implemented using one or more display panels, which can include, for example, one or more cathode ray tube (CRT) displays, liquid crystal displays (LCDs), plasma displays, light emitting diode (LED) displays, touch screen type displays, projector displays (e.g., images projected on a screen or surface, holographic images, etc.), organic light emitting diode (OLED) displays, field emission displays (FEDs), active matrix displays, vacuum fluorescent (VFR) displays, 3-dimensional (3-D) displays, electronic paper (e-ink) displays, microdisplays, or any combination of the above types of displays.

A computer system 200 can further include one or more input/output (I/O) devices 230 connected through an I/O controller 223, both of which can communicate via system interface(s) 250. An I/O device 230 can include, for example, one or more keys, buttons, keyboards, mice, joysticks, styluses, gesture sensors (e.g., video cameras), and/or voice sensors (e.g., microphones). Keys, keyboards, and/or buttons can be physical and/or virtual (e.g., provided on a touch screen interface). I/O device(s) 230 can also include a storage device and/or an installation medium for one or more of client devices 102A-F.

A computer system 200 can support one or more installation devices 216, such as floppy disk drives for receiving floppy disks (e.g., 3.5-inch, 5.25-inch, or Zip Disks), CD-ROM drives, CD-R/RW (readable/rewritable compact disc) drives, DVD-ROM drives, tape drives, universal serial bus (USB) devices, hard-drives, and/or any other device suitable for installing software and programs, such as a client agent 220, or portion thereof. Installation device(s) 216 could also be used as storage device(s) 228.

A computer system 200 can further include one or more network interfaces 218 for interfacing to a network, such as a PAN, LAN, MAN, WAN, and/or the Internet through a variety of connections, including, but not limited to, standard telephone lines, LAN or WAN links (e.g., 802.11, T1, T3, 56 kb, X.25), broadband connections (e.g., integrated services digital network (ISDN), Frame Relay, asynchronous transfer mode (ATM)), wireless connections, or some combination of any or all of the above. Network interface(s) 218 can comprise a built-in network adapter, network interface card, personal computer memory card international association (PCMCIA) network card, card bus network adapter, wireless network adapter, USB network adapter, modem, and/or any other device suitable for interfacing computer system 200 to any type of network.

As illustrated in FIG. 2B, CPU(s) 221 of a computer system 200 can communicate directly with one or more memories 222 via one or more memory ports 203, and similarly GPU(s) 225 can communicate directly with one or more graphic memories 226. CPU(s) 221 can also communicate with cache(s) 240 via one or more secondary busses, sometimes referred to as backside busses. In some embodiments, CPU(s) 221 can communicate with cache(s) 240 via system interface(s) 250. A cache 240 can have a faster response time than a memory 222. In some embodiments, such as in the embodiments illustrated in FIG. 2B, CPU(s) 221 can communicate directly with I/O device(s) 230 via one or more I/O ports. In further embodiments, I/O device(s) 230 can include one or more bridges 270 between system interface(s) 250 and one or more external communication busses, such as USB busses, Apple Desktop Busses, RS-232 serial connections, small computer system interface (SCSI) busses, FireWire busses, Ethernet busses, ATM busses, high performance parallel interface (HIPPI) busses, Super HIPPI busses, SerialPlus busses, SCI/LAMP busses, FibreChannel busses, and/or Serial Attached small computer system interface busses.

As shown in FIG. 2B, GPU(s) 225 can also communicate directly with one or more graphic memories 226, memories 222, storage devices 228, and/or display devices 224. GPU(s) 225 can communicate with CPU(s) 221 and/or other devices through system interface(s) 250. One or more graphic memories 226 can also include one or more frame buffers 316. A frame buffer 316 can be a graphic output device that drives one or more display devices (e.g., display devices 224) from one or more memory buffers of one or more graphic memories 226 containing a complete frame of graphical data. Frame buffer(s) 316 can store one or more final graphical frames, which are to be displayed on display devices 224.

Figure 3:
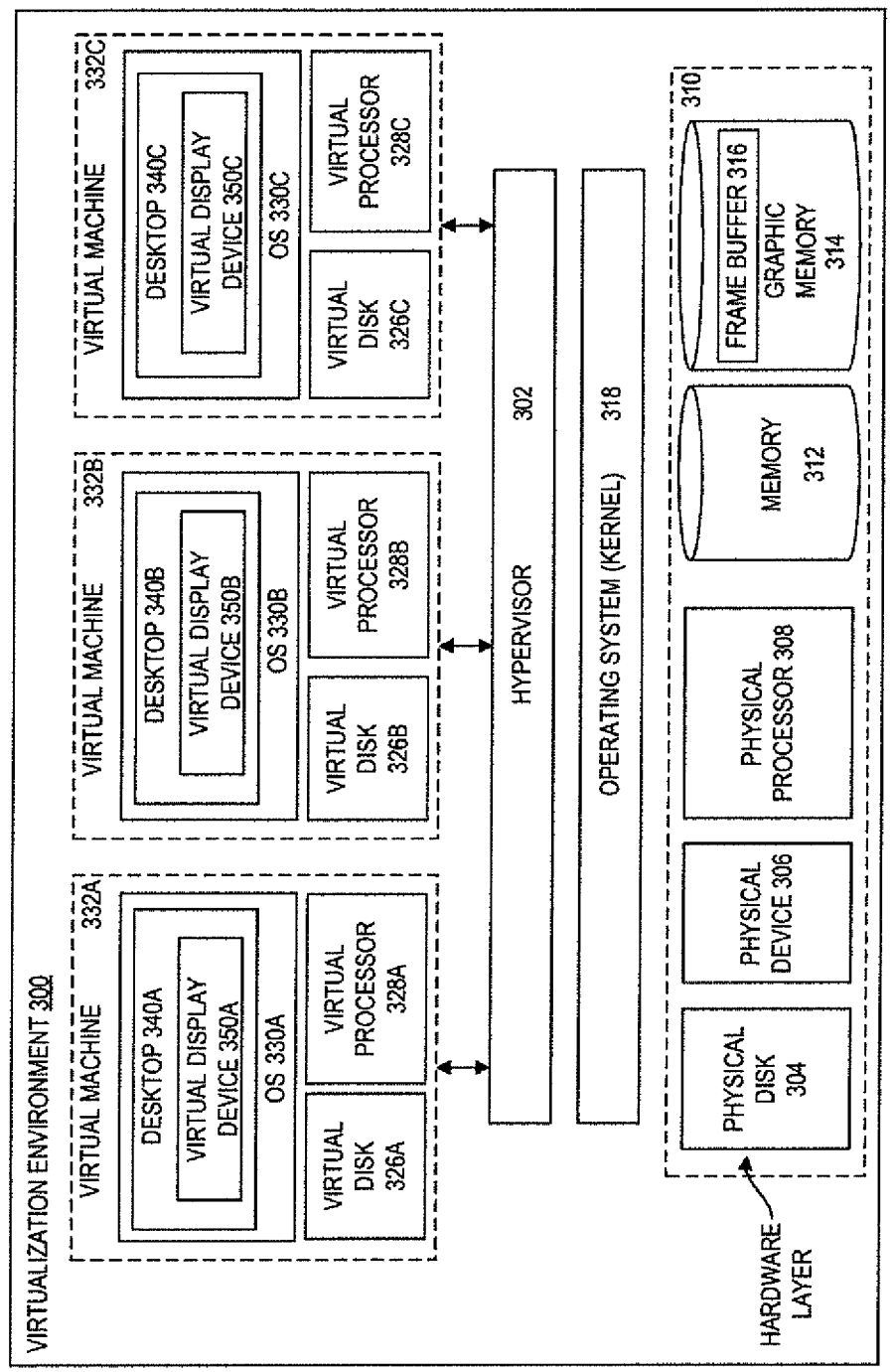
FIG. 3 is a simplified block diagram of an illustrative virtualization environment, consistent with embodiments as described herein.

FIG. 3 is a block diagram illustrating a virtualization environment 300. In some embodiments, virtualization environment 300 can be implemented on a computer system 200 (e.g., server 122 and/or a client device 102A-F). A computer system 200 that implements a virtualization environment 300 can be referred to as a host computer system. In some embodiments, the modules, programs, virtual machines, and/or commands stored and/or executed by virtualization environment 300 can be executed by more than one computer system 200. For example, virtualization environment 300 can be implemented by a data center 120, such as a data center 120 including a server farm.

Virtualization environment 300 can include a hardware layer 310 that can include one or more physical disks 304, one or more physical devices 306, one or more physical processors 308, one or more memories 312, and one or more graphical memories 314. In some embodiments, one or more frame buffers 316 can be stored within one or more memory elements in one or more graphic memories 314, and can be accessed by one or more physical processors 308.

A physical disk 304 can be either an internal or an external physical hard disk, such as a disk of one of the memories 222 and/or storage devices 228 described with reference to FIGS. 2A-2B. Physical and/or virtual elements in a virtualization environment 300 can communicate with physical disk(s) 304 to store and/or retrieve data. Physical device(s) 306 can include one or more physical devices included in virtualization environment 300 and/or external physical devices that can communicate with virtualization environment 300. A physical device can be any device, such as a network interface card, a video card, a keyboard, a pointing device, an input device, a physical display device, a speaker, an optical drive, a storage device, a USB connection, a printer, a scanner, any device connected to virtualization environment 300, or any device communicating with virtualization environment 300. A pointing device can be, for example, a mouse, stylus, trackball, joystick, pointing stick, human finger, any input device disclosed with reference to computer system 200, or any other input interface that can allow a user to input spatial data to a computing device. In some embodiments, physical processor(s) 308 can include one or more CPUs 221 and/or GPUs 225.

Virtualization environment 300 can include one or more memories 312. A memory 312 can include any type of memory that can store data, programs, firmware, and/or executable instructions. In some embodiments, a memory 312 can include one or more memories 222. Programs, firmware, and/or executable instructions stored in one or more memories 312 can be executed by one or more physical processors 308 of virtualization environment 300. One or more graphic memories 314 can include any memory accessible by physical processor(s) 308, including local memory, system memory, on-chip memory, and hard disks. In some embodiments, a graphic memory 314 can include one or more graphic memories 226. Physical processor(s) 308 can cause certain graphics corresponding to graphical data stored in one or more graphic memories 314 to be displayed on a physical display device (e.g., one of physical device(s) 306, which can correspond to a display device 224).

Virtualization environment 300 can further include an operating system 318 that can be stored in one or more memories 312 and executed by one or more physical processors 308. Operating system 318 can also be referred to as a kernel. Moreover, virtualization environment 300 can include a hypervisor 302. Hypervisor 302 can be a program executed by physical processor(s) 308 in virtualization environment 300 to manage any number of virtual machines. In some embodiments, hypervisor 302 can be any combination of executable instructions and/or hardware that monitors virtual machines executing on a computer system 200, such as a server 122. Hypervisor 302 can be stored in one or more memories 312.

Hypervisor 302 can allocate physical resources from a hardware layer 310 and/or virtual resources to one or more virtual machines, e.g., virtual machines 332A-C. A virtual machine can be a software-based emulation of a physical machine, such as a computer system 200. A virtual machine 332A-C can further include a software-based emulation of the execution of software programs on such a physical machine. For example, a virtual machine can emulate the execution of an operating system and/or application on a particularly configured physical machine. Accordingly, a virtual machine can have a virtual operating system (OS) (e.g., OS 330A for virtual machine 332A, OS 330B for virtual machine 332B, and OS 330C for virtual machine 332C). A virtual machine 332A-C can have access to the host computer system's hardware resources through hypervisor 302, which either runs directly on the host computer's hardware (i.e., a bare metal hypervisor) or runs within the host computer's operating system (i.e., a hosted hypervisor).

In some embodiments, hypervisor 302 can provide physical and/or virtual resources to operating systems 330A-C in any manner such that hypervisor 302 simulates any desirable operating system (e.g., Windows, Linux, Unix) to execute on virtual machines 332A-C. The system resources can include, for example, resources from hardware layer 310 and/or any other component included in virtualization environment 300. In these embodiments, hypervisor 302 can be used to partition physical hardware, emulate physical hardware, and/or execute virtual machines that provide users accessing virtualization environment 300 with various computing environments. In some embodiments, hypervisor 302 can control processor scheduling and memory partitioning for virtual machine(s) 332A-C executing in virtualization environment 300.

In some embodiments, hypervisor 302 can create virtual machines 332A-C, in which virtual operating systems 330A-C execute. As an example, hypervisor 302 can load a virtual machine image to create a virtual machine 332A-C. As another example, hypervisor 302 can execute virtual operating systems 330A-C within virtual machines 332A-C, respectively. Operating systems 330A-C are further described in detail below.

In some embodiments, hypervisor 302 of virtualization environment 300 can be a bare metal hypervisor, or a hypervisor that has direct access to applications and processes executing in the host computing system, resources on the host computing system, and hardware on the host computing system (e.g., hardware layer 310 shown in FIG. 3) or communicating with the host computing system. In some embodiments, a bare metal hypervisor can directly access all system resources. For example, if hypervisor 302 is a bare metal hypervisor, it can execute directly on one or more physical processors 308, and can retrieve data stored in one or more memories 312 and/or one or more graphic memories 314. By contrast, a host hypervisor accesses system resources through a host operating system (e.g., operating system 318).

In a virtualization environment that employs a bare metal hypervisor configuration, the host operating system (e.g., operating system 318) can be executed by one or more virtual machines 332. Thus, a user accessing virtualization environment 300 can designate one or more virtual machines 332 as a virtual machine for imitating the host operating system and allowing the user to interact with the virtual machine in substantially the same manner that the user would interact with the host computing system via host operating system 318.

Virtualization environment 300 can host or execute one or more virtual machines 332A-C. In some embodiments, a virtual machine 332A-C can be created for each user accessing virtualization environment 300, for each user requesting a virtual machine 332A-C, and/or for each user requesting a virtual desktop 340A-C. A virtual machine 332A-C can be a set of executable instructions that, when executed by physical processor(s) 308, imitate the operation of a physical computing device such that programs and processes can be executed on a virtual machine 332A-C in a manner similar to that on a physical computing device. It is appreciated that virtualization environment 300 can host any number of virtual machines 332A-C. In some embodiments, one or more virtual machines 332A-C can be provided, such as by hypervisor 302, with a unique virtual view of the physical hardware, memory, processor, and other system resources available to that virtual machine 332A-C (e.g., virtual disk 326A-C and/or virtual processor 328A-C). The unique virtual view can be based on, for example, virtual machine permissions, application of a policy engine to one or more virtual machine identifiers, the user accessing a virtual machine, the applications executing on a virtual machine, networks accessed by a virtual machine, or any other desired criteria. In some embodiments, a virtual machine 332A-C can be provided with a virtual view of resources that are substantially similar to the physical hardware, memory, processor, and/or other system resources available to the virtual machine 332A-C.

As shown in FIG. 3, virtual machines 332A-C can include one or more virtual disks 326A-C. Virtual disks 326A-C can correspond to, for example, one or more physical disks or one or more portions of a physical disk (e.g., physical disk(s) 304). As an example, virtual disk 326A can be allocated a first portion of physical disk(s) 304, virtual disk 326B can be allocated a second portion of physical disk(s) 304, and virtual disk 326C can be allocated a third portion of physical disk(s) 304. In some embodiments, one or more of virtual disks 326A-C can include one or more virtual disk partitions and/or file system(s), similar to those of a physical disk. For example, virtual disk 326A can include a virtual system disk, which includes virtual disk partitions and system files associated with virtual machine 332A. In some embodiments, the virtual system disk can be shared among virtual machines. For example, virtual machines 332B and 332C can have the same or similar system disk as virtual machine 332A.

The virtual file systems of virtual disks 326A-C can also include virtual files and/or folders. For example, virtual disk 326A can also include a virtual user disk, which can store user data such as user files and/or folders. In some embodiments, system and/or user data stored on a virtual system and/or user disk can be synchronized with disks stored in a server (e.g., server 122). The synchronization of a virtual system and/or a user disk between a virtual disk 326 and a server 122 can be performed, for example, to save data from the virtual system and/or user disk. In some embodiments, a virtual disk can also include a local disk. The local disk can store data associated with a virtual machine (e.g., virtual machine 332A-C) in persistent storage, such as in one or more physical disks 304 and/or memories 312.

In some embodiments, virtualization environment 300 can also include virtual apertures (not shown) in a virtual memory space, which can be a view of the virtual memory available to virtual machines 332A-C. The virtual apertures can correspond to, for example, physical caches, buffers, and/or memories, such as one or more memories 312, graphic memories 314, and/or internal or external physical disks such as hard disk(s) 304. As an example, under the circumstances that applications running on a virtual machine 332A-C do not require more memory than that which is available in one or more memories 312, the virtual apertures of a virtual machine 332A-C can correspond to a portion of one or more memories 312. As another example, under the circumstances that applications executed by a virtual machine 332A-C require more memory than that which is available in one or more memories 312, the virtual apertures of a virtual machine 332A-C can correspond to one or more portions of one or more memories 312, graphic memories 314, and/or physical disks 304. The virtual apertures can be generated, provided, and/or managed by hypervisor 302.

Virtual processors 328A-C can be virtualized views of one or more physical processors 308 of virtualization environment 300. In some embodiments, a virtualized view of physical processor(s) 308 can be generated, provided, and/or managed by hypervisor 302. In some embodiments, virtual processor(s) 328A-C can have substantially the same characteristics as those of physical processor(s) 308. In some embodiments, virtual processor(s) 328A-C can provide a modified view of physical processor(s) 308, such that at least some of the characteristics of virtual processor(s) 328A-C are different from the characteristics of corresponding physical processor(s) 308.

As shown in FIG. 3, a virtual operating system 330A-C can provide a user of a virtual machine 332A-C with a virtual desktop 340A-C corresponding to the virtual operating system 330A-C being executed on the virtual machine. For example, if a virtual machine 332A executes a virtual operating system 330A that is a virtualization of a Windows™ 7 operating system, virtual desktop 340A can be a virtualization of a desktop environment that is displayed to a user using a Windows™ 7 operating system. A user of a client device 102A-F can interact with a virtual desktop of virtualization environment 300 to interact with virtual programs, applications, files, and/or other computing resources, similar to the way a user would interact with these resources on a physical computing device.

A client device 102A-F can communicate with server(s) 122 of data center(s) 120 using a remote display protocol to access a virtualization environment 300. For example, a client application installed on a client device 102A-F can allow the client device to communicate with a virtualization environment 300 through a communications protocol, such as independent computing architecture (ICA) protocol. This can allow a user to access resources within a virtualization environment 300. Such resources can include programs, applications, files, executable instruction codes, virtual desktops 340A-C, computing environments, and/or other resources made available to users of virtualization environment 300.

In some embodiments, virtualization environment 300 can be implemented on one or more servers 122. A client device 102A-F accessing virtualization environment 300 can send input/output information corresponding to a user's interactions with a virtual desktop, and the client device can receive display information from virtualization environment 300 corresponding to the interactions. In some embodiments, all applications and data implemented by the virtual machine remain in a data center 120, with only display, keyboard, and mouse information being communicated between a client device 102A-F and data center(s) 120. For example, a user can select to open a Microsoft™ Word application from a virtual desktop, and keyboard and/or mouse commands can be transmitted from a client device 102A-F of the user to data center(s) 120. Data center(s) 120 can open a virtualized version of Microsoft™ Word in a virtualized desktop on virtual machine 332A in a virtualization environment 300, and can send an image frame of the virtual desktop with Microsoft™ Word opened to the client device for display. In this way, information regarding client interactions is transmitted from a client device 102A-F to a virtualization environment, software is executed in virtualization environment to implement changes to a virtual desktop, and updated image frames are transmitted to the client device to display the changes to the virtual desktop. Alternatively, the client application can be configured to execute a portion of the virtualization environment 300 on the client device, so that some of the software associated with the virtualization environment 300 is executed at the client device, and other software associated with the virtualization environment 300 is executed at one or more data centers. In some embodiments, virtualization environment 300 is implemented on a client device 102A-F, and a virtual desktop can be displayed to a user of the client device without having to communicate with another device over a network.

A virtualization environment 300 can support a number of client devices 102A-F. In some embodiments, each user requesting access to virtualization environment 300 can be provided their own virtual machine 332A-C. For example, a first user of a client device 102A can request a virtualized Windows™ 7 computing environment, and can be provided with virtual machine 332A implementing a virtual Windows™ 7 operating system. A second user of a client device 102B can request a virtualized Linux computing environment, and can be provided with a virtual machine 332B implementing a virtual Linux operating system at the same time as virtual machine 332A is being provided to the first user. And although three virtual machines 332A-C are illustrated in the virtualization environment 300 of FIG. 3, this is not to be limiting. Virtualization environment 300 can provide any number of virtual machines to any number of client devices 102A-F. In some embodiments, each client device 102A-F requesting access to virtualization environment 300 can be provided with its own virtual machine 332A. In some other embodiments, a plurality of client devices 102A-F can share a virtual machine. One or more computer systems 200 implementing a virtualization environment 300 can dynamically allocate virtual machines as requested by client devices. That is, when a user has stopped using a virtual machine, computing system(s) 200 can close the virtual machine and re-allocate the computing resources being utilized for that virtual machine, so that the resources can be used for other purposes (e.g., for other virtual machines).

Virtualization environment 300 can also determine properties of one or more display devices 224 connected to a client device 102A-F accessing virtualization environment 300, and can generate one or more virtual display devices 350A-C that virtualize the display of a desktop 340A-C on a physical display device having those properties. The properties can include, for example, an aspect ratio, resolution, size, dimension, type, refresh rate, number of pixels, supported video format, or contrast of a display device 224 connected to a client device 102A-F. For example, virtualization environment 300 can identify a client device 102C accessing virtualization environment 300 as having a touch sensitive tablet display of a certain resolution, such as 1024×768 pixels. Virtualization environment 300 can provide client device 102C with virtual desktop 340A of a virtual machine 332A running a virtual operating system 330A, and create one or more virtual display devices 350A corresponding to the properties of display devices 224 of client device 102C. Images of virtual desktop 340A can then be provided to client device 102C using virtual display devices 350A, so that the images are captured with properties that correspond to the properties of a display device 224 connected to client device 102C. For example, a virtual display device 350A can be created with a 1024×768 pixels resolution, so that images of virtual desktop 340B are captured and provided to client device 102C with the same resolution as a display device 224 connected to client device 102C. Accordingly, virtualization environment 300 can provide a plurality of different virtual desktops 340A-C in a plurality of different virtual display devices 350A-C to a plurality of different client devices 102A-F having different types of display devices 224.

In some embodiments, virtual display devices 350A-C may not necessarily correspond to physical display devices. For example, a user of a client device 102A-F accessing virtualization environment 300 can select any desired display device properties for the one or more virtual display devices provided for the user's virtual machine. Alternatively, virtualization environment 300 can be pre-configured to create virtual display devices 350A-C having certain properties.

While the below various embodiments use a virtualization environment (e.g., virtualization environment 300) as examples, it is appreciated that the various embodiments can also be implemented using a remote computing environment. A remote computing environment can include one or more host computers, one or more remote computers, and one or more networks connecting the host computers and remote computers. For example, a client device 102 can be a remote computer accessible by a host computer (e.g., server 122 or one or more of other client devices 102) using private network 110 and/or public network 104. Hardware and/or software resources of a remote computer can be accessed using, for example, a remote desktop application. The remote desktop application can allow obtaining data (e.g., GPUs' capabilities data and/or display devices' properties data) provided by the remote computer. The remote desktop application can also provide the obtained data to the host computer and allow the host computer to send instructions (e.g., command data) to the remote computer for operating the hardware resources or executing applications on the remote computer.

Figure 4A:
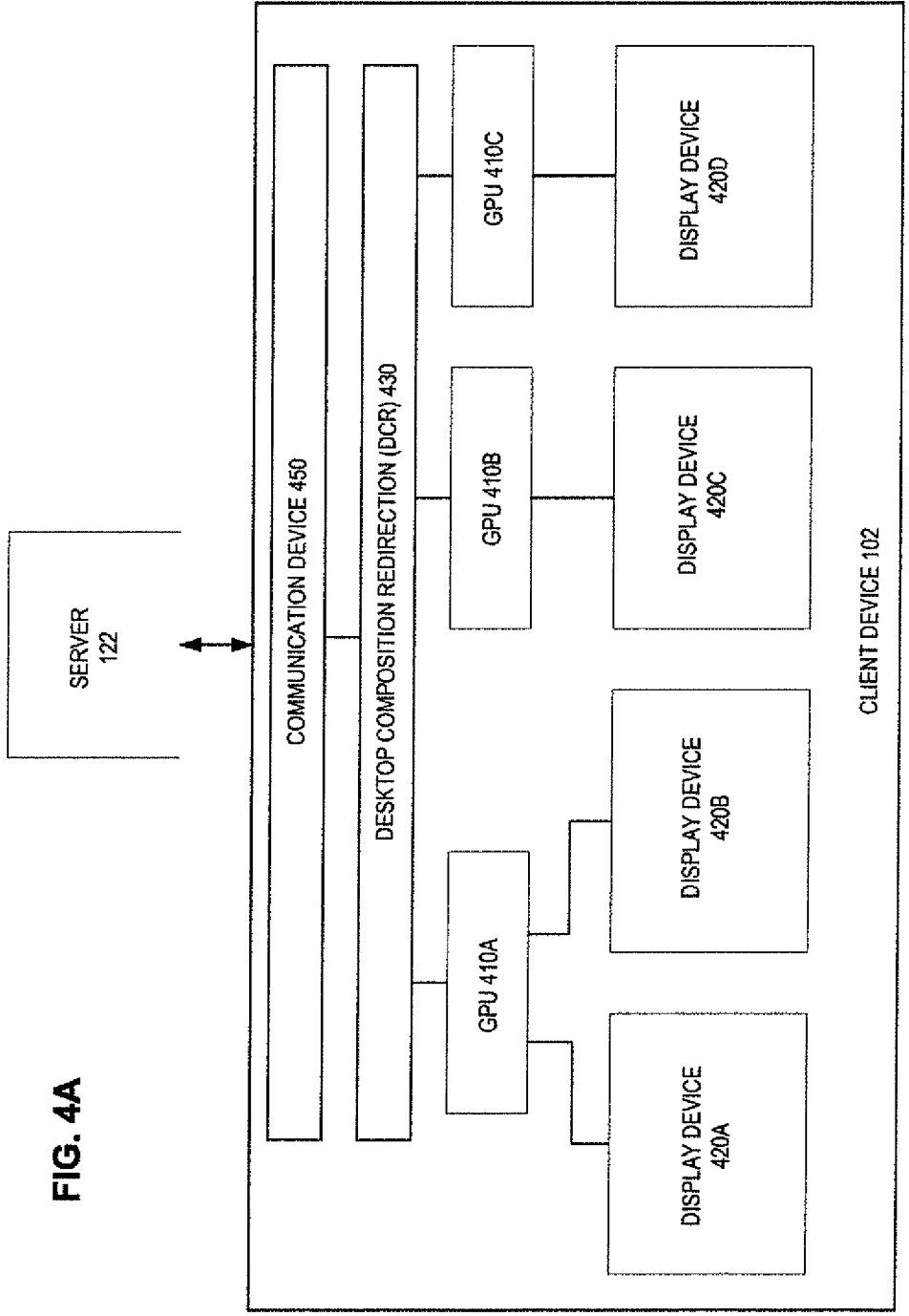
FIG. 4A is a simplified block diagram of an illustrative client device for providing adaptive displaying on a plurality of display devices, consistent with embodiments as described herein.

FIG. 4A is a simplified block diagram illustrating a client device 102 for providing adaptive displaying on a plurality of display devices (e.g., display devices 420A-D), consistent with embodiments as described herein. Client device 102 can be implemented using, for example, computer system 200. Referring to FIG. 4A, client device 102 can include GPUs 410A-C, display devices 420A-D, a desktop composition redirection (DCR) 430, and a communication device 450. It is appreciated that client device 102 can include any number of GPUs, display devices, DCRs, and communication devices. GPU 410A-C can be any type of specialized circuitry that can manipulate and alter memory (e.g., a graphic memory 226) to provide and/or accelerate the creation of images stored in a frame buffer (e.g., frame buffer 316) for output to one or more display devices 420A-D. GPUs 410A-C can be dedicated graphic processors or circuitry integrated with, for example, a CPU, a chipset, or other components of a computer system. GPUs 410A-C can be the same or different type of GPUs. For example, GPU 410A can be Nvidia's Quadro™ GPU, a GeForce™ GPU, Tegra™ GPU, Tesla™ GPU, etc. GPU 410B can be AMD's Radeon™ GPU, FirePro™ GPU, etc. GPU 410C can be Intel's HD graphics processor or Iris™ graphics processor, Iris Pro™ graphics processor, etc.

Different types of GPUs can have different capabilities such as texture mapping capabilities, rendering capabilities, acceleration and frame-buffering capabilities, shading capabilities, instruction processing capabilities, video decoding capabilities, etc. The texture mapping capabilities relate to GPU's capabilities to add details, surface texture (e.g., a bitmap or raster image), or colors to images or models (e.g., two-dimensional (2D) or three-dimensional (3D) models). The rendering capabilities relate to the GPU's capabilities to generate an image based on 2D or 3D models of objects being depicted. The acceleration capabilities relate to GPU's capabilities to accelerate the generation of images in a frame buffer. The frame-buffering capabilities relate to GPU's capabilities to drive a display device (e.g., a monitor) from a memory buffer that contains a complete frame of graphical data. The shading capabilities relate to GPU's capabilities to depict depth perception in 3D models or illustrations by varying levels of darkness. The instruction processing capabilities relate to GPU's capabilities to process instructions in a certain period of time. The video decoding capabilities relate to GPU's capabilities to decompress a compressed video based on a variety of video codecs.

As shown in FIG. 4A, in some embodiments, GPU 410A-C can be associated with one or more display device 420A-D for displaying images on the corresponding display devices. Display devices 420A-D can be implemented by, for example, display device 224 shown in FIG. 2B. In some embodiments, GPU 410A can be associated with two display devices: display device 420A-B. GPU 410B can be associated with display device 420C and GPU 410C can be associated with display device 420D. Display devices 420A-D can be the same type of display devices or different types of display devices. For example, display devices 420A and 420B can be Samsung's SyncMaster™ monitors. Display devices 420A and 420B can also be a Samsung's SyncMaster™ monitor and a LG Flatron™ monitor, respectively. Display device 420C can be Apple's Thunderbolt™ monitor and display device 420D can be HP's Pavilion™ monitor.

Referring to FIG. 4A, client device 102 can also include DCR 430. DCR 430 manages the use of processing capabilities of GPUs (e.g., GPUs 410A-C) or integrated graphics processors (IGPs, not shown) of client device 102 for rendering graphics. For example, DCR 430 can allow the graphics rasterization to be performed by GPUs 410A-C while allowing the using of a CPU (e.g., CPU 221 shown in FIG. 2B) of client device 102 for protocol compression to reduce the amount of bandwidth required to carry the graphics commands. To manage the use of GPUs, IGPs, CPUs, and any other hardware resources of client device 102, DCR 430 can obtain the capabilities of the hardware resources, for example, GPUs 410A-C. DCR 430 can be a software application or a hardware device, or a combination of both.

In some embodiments, DCR 430 can obtain capabilities data associated with one or more GPUs 410A-C. The capabilities data reflect the GPU's capabilities such as texture mapping capabilities, rendering capabilities, acceleration and frame-buffering capabilities, shading capabilities, instruction processing capabilities, or video decoding capabilities. For example, DCR 430 can query each of GPUs 410A-C to obtain the type of GPUs 410A-C, the shade versions, the simultaneous targets read capabilities, the number of instructions that GPUs 410A-C are capable of processing, or any other GPU capabilities. After DCR 430 obtains the capabilities of one or more GPUs 410A-C, communication device 450 of client device 102 can provide the capabilities data associated with each GPUs 410A-C to server 122. Communication device 450 can be implemented by using, for example, network interface 218 shown in FIG. 2A.

Referring to FIG. 4A, in some embodiments, DCR 430 can also obtain properties data associated with one or more of display devices 420A-D. As shown in FIG. 4A, each of display devices 420A-D can be associated with one of GPUs 410A-C. The properties data reflect one or more properties of a display device 420, such as extended display identification data (EDID) information, physical sizes of the display devices, display resolutions supported by the display devices, pixel pitches, luminance, aspect ratios, viewable image sizes, refresh rates, response times, contrast ratios, power consumptions, or color accuracies. The EDID is a data structure provided by a display device (e.g., a digital monitor) to describe its capabilities to a video source. Physical sizes of the display device can include, for example, width and height of the display device. Display resolution is the number of distinct pixels in each dimension that can be displayed. For example, display resolutions can be 480 p (720×480 pixels), 720 p (1280×720 pixels), 1080 p (1920×1080 pixels), etc.

As described above, the properties of a display device 420 can also include, for example, pixel pitches, luminance, aspect ratios, viewable image sizes, refresh rates, response times, contrast ratios, power consumptions, or color accuracies. A pixel pitch is the distance between pixels or dots on the screen of a display device. Luminance is a photometric measure of the luminous intensity per unit area of light travelling in a given direction. It can describe the amount of light that is emitted from a display device. An aspect ratio is the ratio between the dimensions (e.g., width and height) of a display device. Viewable image size or display size is the physical size of the area where an image or video can be displayed on a display device. A refresh rate is the number of times in a unit period of time (e.g., a second) that a display device can update its buffer. A response time is the total amount of time it takes for a display device to respond to a request to display. A contrast ratio is a ratio of the luminance of the brightest color (white) to that of the darkest color (black) that a display device is capable of producing. A power consumption is a measure of the energy consumption of a display device. A color accuracy refers to the degree that the display device can reproduce one or more colors.

Referring to FIG. 4A, display devices 420A-D can be the same type of display devices or different types of display devices. Different type of display device can have different properties. For example, display device 420A can have a different display resolution from that of display device 420C. In some embodiments, DCR 430 can query each of display devices 420A-D to obtain properties data that reflect one or more properties of display devices 420A-D. After DCR 430 obtains the properties of one or more display devices 420A-D, communication device 450 of client device 120 can provide the properties data associated with one or more of display devices 420A-D to server 122. In FIG. 4A, while DCR 430 is included in client device 102, it is appreciated that client device 102 can also include any other type of hardware or software components, such as components operating under non-DCR protocols (e.g., ThinWire).

Referring to FIG. 4A, in some embodiments, DCR 430 can query at least one of GPUs 410A-C or display devices 420A-D based on instructions provided by one or more components of client device 102 (e.g., instructions stored in the memory of client device 102) or based on instructions received from server 122. For example, client device 102 can detect that an additional GPU or an additional display device is connected or plugged in, that an existing GPU or an existing display device is disconnected, or that an existing GPU or an existing display device is changed to another type. After such detection, DCR 430 can be instructed to query the additional GPU or display device or to re-query all GPUs or display devices currently associated with client device 102. Based on such query, DCR 430 can obtain updated capabilities of the GPUs and/or updated properties of the display devices. In some embodiments, server 122 can instruct DCR 430 to query GPUs or display devices currently associated with client device 102. For example, server 122 can provide instructions to client device 102 to request DCR 430 to periodically query all GPUs or display devices associated with client device 102. Server 122 can also provide instruction to client device 102 to detect the change of GPUs or display devices and selectively query the changed or additional GPUs or display devices.

Figure 4B:
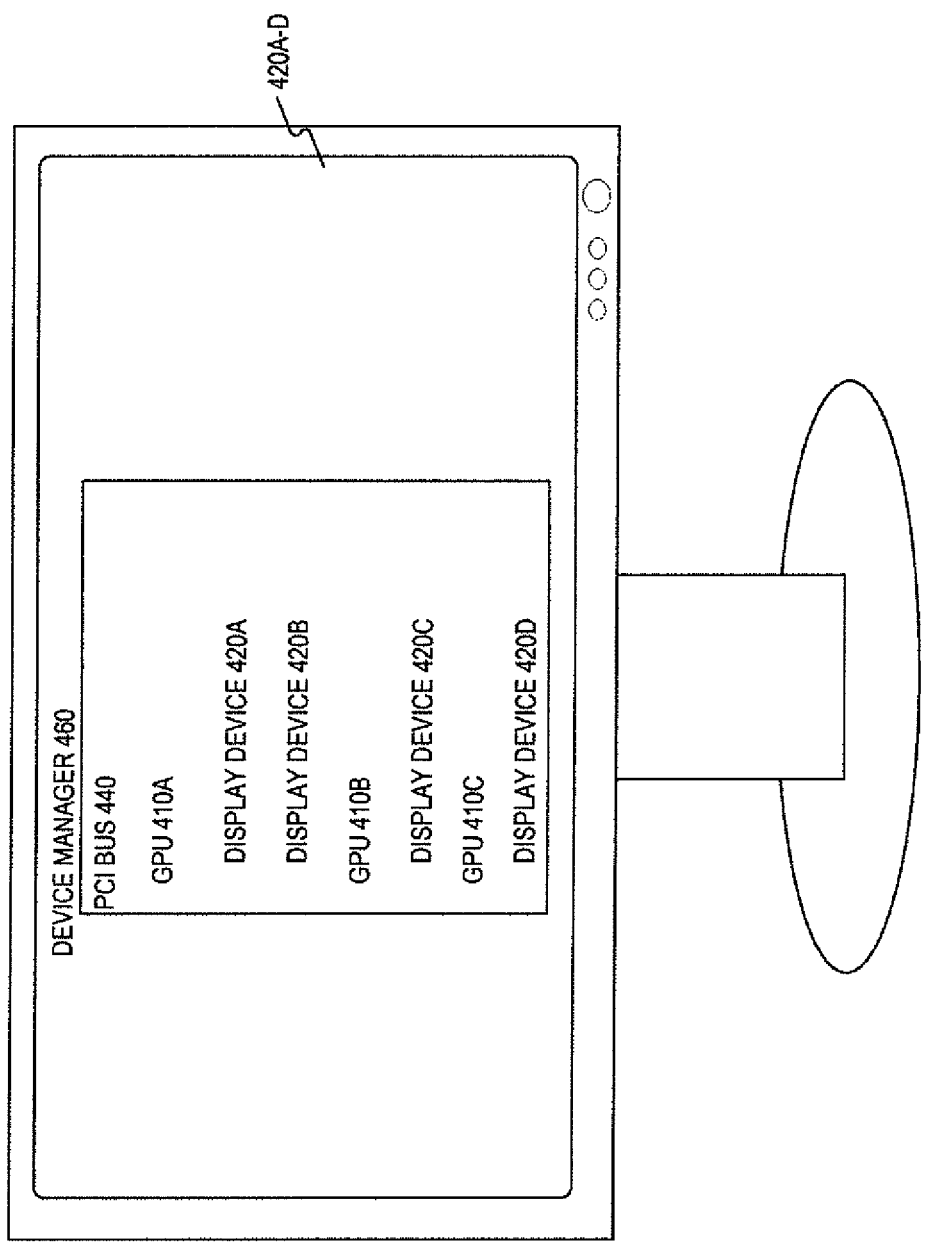
FIG. 4B is an illustrative screen view of a device manager of a client device, consistent with embodiments as described herein.

FIG. 4B is an illustrative screen view of a device manager 460 of client device 102, consistent with embodiments as described herein. As shown in FIG. 4B, one or more display devices 420A-D or any other display device associated with client device 120 can display a view of device manager 460. Device manager 460 can be a control panel applet in the operating system of client device 120. Device manager 460 can provide the listing of devices currently associated with client device 120, and allow users to view and control the devices. For example, in FIG. 4B, corresponding to the embodiment shown in FIG. 4A, the screen view of device manager 460 shows a client device 102 having PCI bus 440 that is used by GPUs 410A-C. The screen view of device manager 460 further shows that GPU 410A drives display devices 420A-B, GPU 410B drive display device 420C, and GPU 410C drives display device 420D.

Figure 5A:
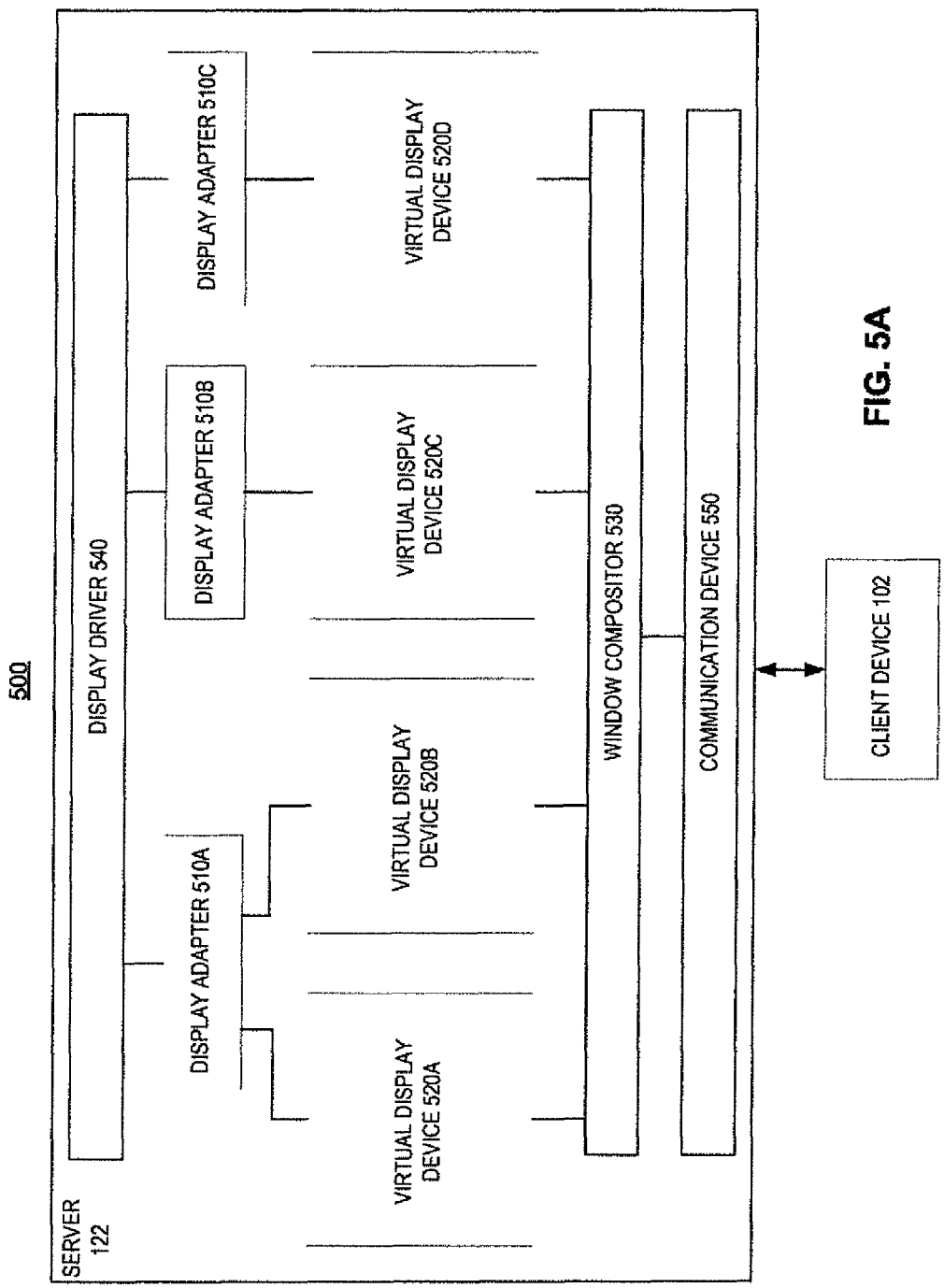
FIG. 5A is a simplified block diagram of an illustrative server for providing adaptive displaying on a plurality of display devices, consistent with embodiments as described herein.

FIG. 5A is a simplified block diagram illustrating a server 122 for providing adaptive displaying on a plurality of display devices, consistent with embodiments as described herein. In some embodiments, server 122 can be an application server that can execute procedures such as programs, routines, or scripts for supporting its applications. For example, an application server can generate webpages and implement services such as clustering, fail-over, load-balancing, etc. An application server can also operate as a virtual machine for running applications and handling connections to databases and connections to client devices. An application server can be, for example, a Java application server, a .NET Framework, a PHP application server, a mobile application server, and any other server platforms. In some embodiments, a generic server can be configured to become an application server by, for example, installing a virtual delivery agent (VDA) to allow the server to provide virtual desktop or application to client devices. It is appreciated that server 122 can also be any other type of server that can be configured to provide functionalities for providing adaptive displaying on a plurality of display devices.

Referring to FIGS. 4A and 5A, as described above, communication device 450 can provide capabilities data reflecting one or more capabilities of GPUs 410A-C and/or properties data reflecting one or more properties of display devices 420A-D to server 122. After server 122 receives the capabilities data, server 122 can generate a plurality of display adapters 510A-C based on the capabilities data. Each of the display adapters 510A-C can correspond to one of physical GPUs 410A-C. For example, display driver 540 of server 122, such as a windows display driver model (WDDM) driver, can generate display adapter 510A, which carries the capabilities of physical GPUs 410A of client device 120. Similarly, display driver 540 can generate display adapters 510B and 510C, each of which carries the capabilities of GPUs 410B and 410C of client device 120, respectively. Display driver 540 can be a software application or a hardware device, or a combination of both. A display driver can provide the functionality for rendering the desktop and applications using desktop window manager, which can be a composite window manager that allows the use of hardware acceleration to render the graphical user interface of windows.

In some embodiments, display adapters 510A-C can emulate GPUs 410A-C, respectively, such that capabilities of GPUs 410A-C are duplicated on server 122. Display adapters 510A-C of server 122 can be virtualized views of physical hardware resources (e.g., GPUs 410A-C). Virtualized views of GPU 410A-C can be generated by, for example, a hypervisor (hypervisor 302) or a privilege domain virtual machine (a dom0 virtual machine). In some embodiments, display adapters 510A-C can provide a modified view of GPUs 410A-C, such that at least some of the capabilities of display adapters 510A-C are different from the capabilities of corresponding GPUs 410A-C.

Referring to FIGS. 4A and 5A, after server 122 receives the properties data, server 122 can generate a plurality of virtual display devices 520A-D based on the properties data. Each of the virtual display devices 520A-D can correspond to one of physical display devices 420A-D of client device 120. For example, display adapter 510A executing on server 122 can generate virtual display device 520A and 520B, which carries the properties of physical display devices 420A and 420B of client device 120, respectively. Similarly, display adapters 510B and 510C can generate virtual display devices 520B and 520C, which carries the capabilities of physical display device 420B and 420C of client device 120, respectively. As a result, virtual display devices 520A-D can emulate display devices 420A-D, respectively, such that capabilities of display devices 420A-D are duplicated on server 122. In some embodiments, virtual display devices 520A-D can be implemented using one or more of virtual display devices 350 shown in FIG. 3.

In some embodiments, virtual display devices 520A-D of server 122 can be virtualized views of physical hardware resources (e.g., display devices 420A-D). Virtualized views of display device 420A-D can be generated by, for example, a hypervisor (hypervisor 302) or a privilege domain virtual machine (a dom0 virtual machine). In some embodiments, virtual display devices 520A-D may not necessarily correspond to physical display devices 420A-D. For example, a user of a client device 102 accessing a virtualization environment (e.g., virtualization environment 300) can select any desired display device properties for the one or more virtual display devices provided for the user's virtual machine. Alternatively, the virtualization environment can be pre-configured to create virtual display devices 520A-D having certain properties.

As shown in FIG. 5A, after display adapters 510A-C and/or virtual display devices 520A-D are generated, window compositor 530 can generate command data for providing to client device 102. For example, window compositor 530 can be a compositing window manager or a full-screen 3D application. Window compositor 530 can provide applications with an off-screen buffer for each window associated with the applications, composite the off-screen buffers into images for displaying, and write the compositing result to a memory for displaying. Window compositor 530 can also perform processing on buffered windows, applying 2D and/or 3D animated effects such as blending, fading, scaling, rotation, duplication, bending and contortion, shuffling, blurring, redirecting applications, and translating windows into one of a plurality of displays and virtual desktops. A window compositor can be a software application or a hardware device, or a combination of both.

In some embodiments, window compositor 530 can obtain (e.g., query) the capabilities data from the corresponding one or more display adapters 510A-C. Window compositor 530 can use the capabilities data to composite off-screen buffers into images for displaying and/or to perform processing on buffered windows. As described above, the display adapters 510A-C emulate physical GPUs 410A-C and thus the capabilities data of display adapters 510A-C represent the capabilities of GPUs 410A-C of client device 102. Such capabilities includes, for example, texture mapping capabilities, rendering capabilities, acceleration and frame-buffering capabilities, shading capabilities, instruction processing capabilities, and/or video decoding capabilities. After obtaining the capabilities data, window compositor 530 can process and composite the buffered windows based on the capabilities of each of GPUs 410A-C. Using the processing and/or compositing results, window compositor 530 can generate command data for operating GPUs 410A-C of client device 102. The command data can be adapted or customized corresponding to each of GPUs 410A-C.

In some embodiments, window compositor 530 can obtain (e.g., query) the properties data from the one or more virtual display devices 520A-D. Window compositor 530 can use the properties data to composite off-screen buffers into images for displaying and/or to perform processing on buffered windows. As described above, virtual display devices 520A-D emulate physical display devices 420A-D, and thus the properties data of virtual display devices 520A-D represent the properties of display devices 420A-D of client device 102. Such properties include, for example, EDID information, physical sizes of the display devices, display resolutions supported by the display devices, pixel pitches, luminance, aspect ratios, viewable image sizes, refresh rates, response times, contrast ratios, power consumptions, or color accuracies. After obtaining the properties data, window compositor 530 can process and composite the buffered windows based on the properties of each of display devices 420A-D. Using the processing and/or compositing results, window compositor 530 can generate command data for providing to client device 102A-F to operate display devices 420A-D. The command data therefore is adapted or customized corresponding to each of display devices 420A-D.

Further, as a result of such customization, each of display devices 420A-D can be operated according to, for example, their respective dpi (dots-per-inch) properties. In some embodiments, customization of the command data based on the capabilities data of GPUs 410A-C and/or properties data of display devices 420A-D can achieve a higher level of image or video fidelity being displayed. In FIG. 5A, while one window compositor 530 is illustrated, it is appreciated that a plurality of window compositors can be included corresponding to one or more of virtual display devices 520A-D.

As described above, window compositor 530 generates the command data for operating GPUs 410A-C and/or display device 420A-C of client device 102. The command data are adapted to the capabilities of GPUs 410A-C and/or properties of display devices 420A-D. After window compositor 530 generates the command data, communication device 550 can provide the command data to client device 102. Referring to FIG. 4A, in some embodiments, each of GPUs 410A-C can receive command data that is adapted to its capabilities, and execute the command data to render graphics or perform any desired processes. Similarly, each of display devices 420A-D can receive command data that is adapted to its properties, and executes the command data to display images or videos or to perform any desired processes.

Figure 5B:
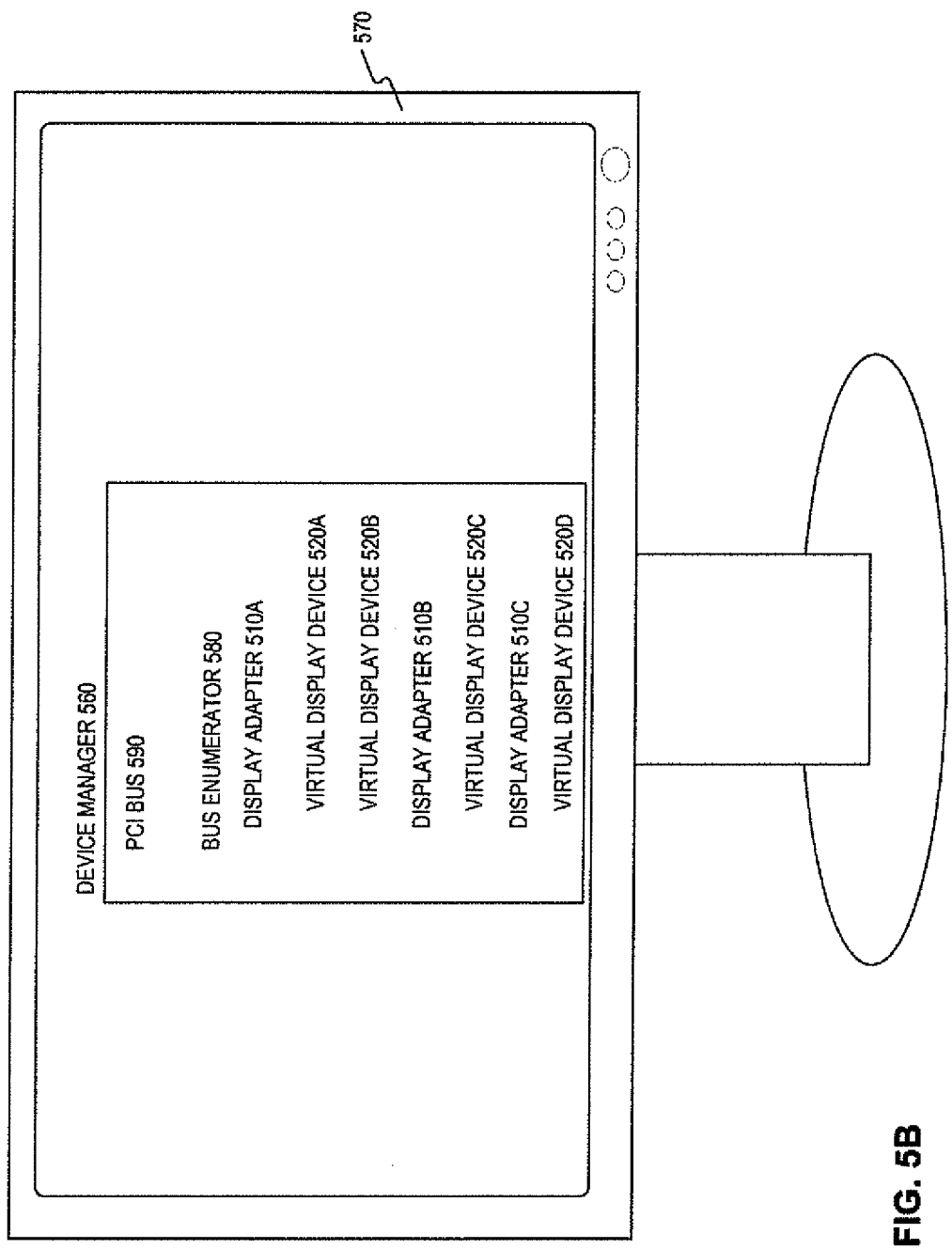
FIG. 5B is an illustrative screen view of a device manager of a server, consistent with embodiments as described herein.

FIG. 5B is an illustrative screen view of a device manager 560 of the server 122, consistent with embodiments as described herein. As shown in FIG. 5B, a physical display device 570 associated with server 122 can display a view of device manager 560 after server 122 is connected to client 102. Device manager 560 can be a control panel applet in the operating system of server 122. Device manager 560 can provide the listing of physical devices currently associated with server 122 or virtual devices generated by server 122, and allow users to view and control the devices or virtual devices. For example, in FIG. 5B, corresponding to the embodiment shown in FIG. 5A, the screen view of device manager 560 shows that server 122 has a bus enumerator 580 that is used by display adapters 510A-C. The screen view of device manager 560 also shows PCI bus 590, which is similar to PCI bus 440 illustrated in FIG. 4B. In some embodiments, unlike GPUs 410A-C that use PCI bus 440, display adapters 510A-C use bus enumerator 580 instead of PCI bus 590. Bus enumerator 580 can be a driver or software application loading built-in drivers or PCI bus drivers that are used by server 122 to run peripheral devices. Bus enumerator 580 can also be a driver or software application that loads display adapters 510A-C to drive virtual display devices 520A-D. Using bus enumerator 580, server 122 can generate and provide command data that are adapted to capabilities of GPUs 410A-C of client device 102 and adapted to the properties of the display devices 420A-D of client device 102. Using the command data, GPUs 410A-C of client device 102 can adaptively process the graphics according to their capabilities and display devices 420A-D can adaptively display processed graphics according to their properties. As a result, the performance of GPUs 410A-C and display devices 420A-D of client device 102 can be enhanced.

In some embodiments, bus enumerator 580 uses enumerated data types having sets of values referred to as enumerators. Enumerators are identifiers that operate as constant definition. As a result, the enumerated data types are static sets of values of data. As shown in FIG. 4B, the screen view of device manager 560 further shows that display adapter 510A drives virtual display device 520A-B, display adapter 510B drives virtual display device 520C, and display adapter 510C drives display device 520D.

FIG. 6 is a flowchart illustrating a method 600 of a server that provides adaptive displaying on a plurality of display devices in a virtualization environment, consistent with embodiments as described herein. Method 600 can be implemented in a computing environment (see, e.g., FIG. 1) using one or more computing systems (see, e.g., FIGS. 2A-B). In some embodiments, method 600 can be performed by one or more servers (e.g., one or more servers 122) implementing a virtualization environment (e.g., virtualization environment 300). It will be readily appreciated that the illustrated procedure can be altered to delete steps or further include additional steps.

After initial step 610, a server (e.g., server 122) can receive (step 615) capabilities data associated with a plurality of graphics processing units (GPUs) of a client device (e.g., client device 102). The plurality of GPUs includes at least one GPU that has at least one different capability from the other GPUs. The GPU capabilities can include, for example, texture mapping capabilities, rendering capabilities, acceleration and frame-buffering capabilities, shading capabilities, instruction processing capabilities, or video decoding capabilities. The server can generate (step 620) a plurality of display adapters based on the capabilities data. In some embodiments, each of the display adapters corresponds to one of the plurality of GPUs.

In step 625, the server can generate command data using the plurality of display adapters. And in step 630, the server can provide the command data to the client device. The command data are adapted to the capabilities of one or more of the plurality of GPUs. The command data can include one or more command streams, which can include one or more commands for operating or controlling the GPUs. Such commands can include, for example, kernel launches, memory copies, or API calls for providing 2D/3D effects or for rendering graphics of objects.

In some embodiments, the server can further receive (step 635) properties data associated with a plurality of display devices of the client device. Each of the plurality of display devices is associated with one of the plurality of GPUs. The properties data can represent display device properties that include, for example, extended display identification data (EDID) information, physical sizes of the display devices, display resolutions supported by the display devices, pixel pitches, luminance, aspect ratios, viewable image sizes, refresh rates, response times, contrast ratios, power consumptions, or color accuracies.

In step 640, the server can generate a plurality of virtual display devices based on the properties data, with each of the virtual display devices corresponding to one of the plurality of display devices of the client device. The server can further generate (step 645) additional command data using the plurality of virtual display devices; and provide (step 650) additional command data to the client device. The additional command data are adapted to the properties of the one or more display devices of the client device. The additional command data can include one or more additional command streams, which can include one or more additional commands for operating or controlling the display devices. Such additional commands can include, for example, color adjustments, geometry adjustments, or image adjustments such as adjustments of display orientation, degauss, gamma, zoom, focus, brightness/contrast, backlight control, etc. As shown in FIG. 6, after step 650, method 600 can proceed to an end 660. Method 600 can also be repeated to provide adaptive displaying on a plurality of display devices in a virtualization environment. Details of method 600 are similar to those discussed above.

Figure 7:
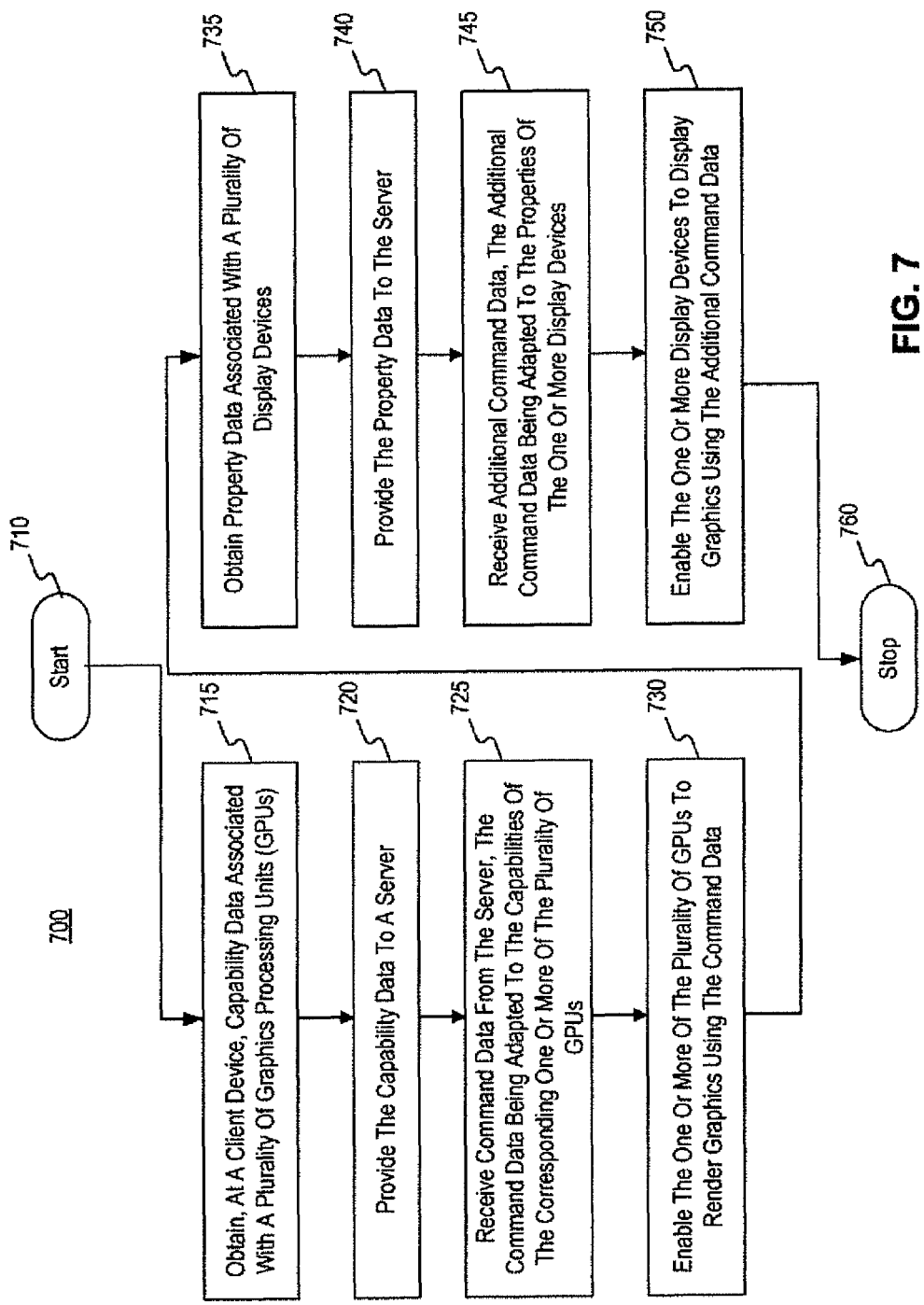
FIG. 7 is a flowchart of an illustrative method of a client device that provides adaptive displaying on a plurality of display devices in a virtualization environment, consistent with embodiments as described herein.

FIG. 7 is a flowchart illustrating a method 700 of a client device that provides adaptive displaying on a plurality of display devices in a virtualization environment, consistent with embodiments as described herein. Method 700 can be implemented in a computing environment (see, e.g., FIG. 1) using one or more computing systems (see, e.g., FIGS. 2A-B). In some embodiments, method 700 can be performed by one or more client devices (e.g., one or more client devices 102) implementing a virtualization environment (e.g., virtualization environment 300). It will be readily appreciated that the illustrated procedure can be altered to delete steps or further include additional steps.

After initial step 710, a client device (e.g., client device 102) can obtain (step 715) capabilities data associated with a plurality of graphics processing units (GPUs) of the client device. The plurality of GPUs include at least one GPU that has at least one different capability from the other GPUs. The client device can provide (step 720) the capabilities data to a server (e.g., server 122), and receive command data from the server. In some embodiments, the command data are adapted to the capabilities of the one or more of the plurality of GPUs based on a plurality of display adapters generated using the capabilities data. The plurality of display adapters are generated by the server. In step 730, the client device can allow one or more of the plurality of GPUs to render graphics using the adapted command data. The command data can include one or more command streams, which can include one or more commands for operating or controlling the GPUs. Such commands can include, for example, kernel launches, memory copies, or API calls for rendering graphics of objects.

The client device can further obtain (step 735) properties data associated with a plurality of display devices. Each of the plurality of display devices is associated with one of the plurality of GPUs. The client device can provide (step 740) the properties data to the server, and receive (step 745) additional command data. The additional command data are adapted to the properties of the one or more of the plurality of display devices based on a plurality of virtual display devices generated using the properties data. The additional command data can include one or more additional command streams, which can include one or more additional commands for operating or controlling the display devices. Such additional commands can include, for example, color adjustments, geometry adjustments, or image adjustments such as adjustments of display orientation, degauss, gamma, zoom, focus, brightness/contrast, backlight control, etc. The client device can allow (step 750) the one or more of the plurality of display devices to display graphics using the additional command data. As shown in FIG. 7, after step 750, method 700 can proceed to an end 760. Method 700 can also be repeated to provide adaptive displaying on a plurality of display devices in a virtualization environment. Details of method 700 are similar to those discussed above.

The methods disclosed herein can be implemented as a computer program product, i.e., a computer program tangibly embodied in an information carrier, e.g., in a non-transitory machine-readable storage device or in a propagated signal, for execution by, or to control the operation of, a data processing apparatus, e.g., a programmable processor, a computer, or multiple computers. A computer program can be written in any form or programming language, including compiled or interpreted languages, and it can be deployed in any form, including as a stand-alone program or as one or more modules, one or more components, one or more subroutines, or one or more other units suitable for use in a computing environment. A computer program can be deployed to be executed on one computer or on multiple computers at one site or distributed across multiple sites and interconnected by a communication network.

In the preceding specification, the subject matter has been described with reference to illustrative embodiments. It will, however, be evident that various modifications and changes can be made without departing from the broader spirit and scope of the subject matter as set forth in the claims that follow. The specification and drawings are accordingly to be regarded as illustrative rather than restrictive. Other embodiments may be apparent to those skilled in the art from consideration of the specification and practice of the embodiments as described herein.

That which is claimed is:

1. A server for providing adaptive displaying on a plurality of display devices in a virtualization environment, comprising:
   a communication device configured to receive capabilities data associated with a plurality of graphics processing units (GPUs) of a client device;
   a display driver configured to generate a plurality of display adapters based on the capabilities data; and
   wherein the communication device is further configured to provide command data to the client device based on the plurality of display adapters, the command data being adapted to the capabilities of one or more of the plurality of GPUs.

2. The server of claim 1, wherein the plurality of GPUs include at least one GPU that has at least one different capability from the other GPUs, and each of the display adapters correspond to one of the plurality of GPUs.

3. The server of claim 1, wherein the capabilities data represent GPU capabilities that include at least one of:

texture mapping capabilities, rendering capabilities, acceleration and frame-buffering capabilities, shading capabilities, instruction processing capabilities, or video decoding capabilities.

4. The server of claim 1, wherein each GPU of the plurality of GPUs is associated with one or more of the plurality of display devices.

5. The server of claim 1, further comprising a window compositor configured to:
obtain the capabilities data from the corresponding one or more display adapters; and
generate the command data based on the obtained capabilities data, wherein the command data allow each of the one or more GPUs to render graphics based on the corresponding GPU's capabilities.

6. The server of claim 1, wherein the command data provides two-dimensional (2D) or three-dimensional (3D) effects including at least one of: blending, fading, scaling, rotation, duplication, bending and contortion, shuffling, blurring, applications redirecting, or windows translating.

7. The server of claim 5, wherein:
the communication device is further configured to receive properties data associated with a plurality of display devices of the client device, each of the plurality of display devices being associated with one of the plurality of GPUs;
the display adapters are configured to generate a plurality of virtual display devices based on the properties data, each of the virtual display devices corresponding to one of the plurality of display devices of the client device;
the window compositor is further configured to generate additional command data using the plurality of virtual display devices; and the communication device is further configured to provide additional command data to the client device, the additional command data being adapted to the properties of the one or more display devices of the client device.

8. The server of claim 7, wherein the properties data represent display device properties that include at least one of: extended display identification data (EDID) information, physical sizes of the display devices, display resolutions supported by the display devices, pixel pitches, luminance, aspect ratios, viewable image sizes, refresh rates, response times, contrast ratios, power consumptions, or color accuracies.

9. A computer-implemented method for providing adaptive displaying on a plurality of display devices in a virtualization environment, the method being performed by a server, the method comprising:
receiving capabilities data associated with a plurality of graphics processing units (GPUs) of a client device;
generating a plurality of display adapters based on the capabilities data; and
providing command data to the client device based on the plurality of display adapters, the command data being adapted to the capabilities of one or more of the plurality of GPUs.

10. The method of claim 9, wherein the plurality of GPUs include at least one GPU that has at least one different capability from the other GPUs, and each of the display adapters correspond to one of the plurality of GPUs.

11. The method of claim 9, wherein the capabilities data represent GPU capabilities that include at least one of: texture mapping capabilities, rendering capabilities, acceleration and frame-buffering capabilities, shading capabilities, instruction processing capabilities, or video decoding capabilities.

12. The method of claim 9, wherein each GPU of the plurality of GPUs is associated with one or more of the plurality of display devices.

13. The method of claim 9, wherein providing the command data comprises:
obtaining the capabilities data from the corresponding one or more display adapters; and
generating the command data based on the obtained capabilities data, wherein the command data allow each of the one or more GPUs to render graphics based on the corresponding GPU's capabilities.

14. The method of claim 9, wherein the command data provides two-dimensional (2D) or three-dimensional (3D) effects including at least one of: blending, fading, scaling, rotation, duplication, bending and contortion, shuffling, blurring, applications redirecting, or windows translating.

15. The method of claim 13, further comprising:
receiving properties data associated with a plurality of display devices of the client device, each of the plurality of display devices being associated with one of the plurality of GPUs;
generating a plurality of virtual display devices based on the properties data, each of the virtual display devices corresponding to one of the plurality of display devices of the client device;
generating additional command data using the plurality of virtual display devices; and
providing additional command data to the client device, the additional command data being adapted to the properties of the one or more display devices of the client device.

16. A non-transitory computer-readable medium storing a set of instructions that are executable by one or more processors of a server to cause the server to perform a method for providing adaptive displaying on a plurality of display devices in a virtualization environment or a remote computing environment, the method comprising:
receiving capabilities data associated with a plurality of graphics processing units (GPUs) of a client device;
generating a plurality of display adapters based on the capabilities data; and
providing command data to the client device based on the plurality of display adapters, the command data being adapted to the capabilities of one or more of the plurality of GPUs.

17. The computer-readable medium of claim 16, wherein the plurality of GPUs include at least one GPU that has at least one different capability from the other GPUs, and each of the display adapters correspond to one of the plurality of GPUs.

18. The computer-readable medium of claim 16, wherein the capabilities data represent GPU capabilities that include at least one of: texture mapping capabilities, rendering capabilities, acceleration and frame-buffering capabilities, shading capabilities, instruction processing capabilities, or video decoding capabilities.

19. The computer-readable medium of claim 16, wherein each GPU of the plurality of GPUs is associated with one or more of the plurality of display devices.

20. The computer-readable medium of claim 16, wherein providing the command data comprises:
obtaining the capabilities data from the corresponding one or more display adapters; and generating the command data based on the obtained capabilities data, wherein the command data allow each of the one or more GPUs to render graphics based on the corresponding GPU's capabilities.

* * * * *